United States Patent
Hosoda

(10) Patent No.: US 11,036,445 B2
(45) Date of Patent: Jun. 15, 2021

(54) PRINTING APPARATUS SUPPORTING CLOUD PRINT SERVICE, METHOD OF CONTROLLING PRINTING APPARATUS, AND STORAGE MEDIUM

(71) Applicant: CANON KABUSHIKI KAISHA, Tokyo (JP)

(72) Inventor: Yasuhiro Hosoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/740,100

(22) Filed: Jan. 10, 2020

(65) Prior Publication Data

US 2020/0233619 A1 Jul. 23, 2020

(30) Foreign Application Priority Data

Jan. 18, 2019 (JP) ............................. JP2019-007009

(51) Int. Cl.
*G06F 3/12* (2006.01)

(52) U.S. Cl.
CPC .......... *G06F 3/1209* (2013.01); *G06F 3/1222* (2013.01); *G06F 3/1236* (2013.01); *G06F 3/1239* (2013.01); *G06F 3/1288* (2013.01)

(58) Field of Classification Search
CPC ..... G06F 3/1288; G06F 3/1239; G06F 3/1236
See application file for complete search history.

(56) References Cited

U.S. PATENT DOCUMENTS

| | | | | |
|---|---|---|---|---|
| 2011/0157631 A1* | 6/2011 | Tsutsumi | ................ | G06F 3/126 358/1.15 |
| 2013/0003106 A1* | 1/2013 | Nishida | .............. | G06K 15/4095 358/1.14 |
| 2013/0318585 A1* | 11/2013 | Hosoda | ............... | H04L 63/0815 726/7 |
| 2014/0226179 A1* | 8/2014 | Minagawa | ............ | G06F 3/1204 358/1.15 |
| 2015/0067800 A1* | 3/2015 | Hosoda | ................ | H04N 1/4433 726/6 |
| 2015/0124282 A1* | 5/2015 | Minagawa | ............ | G06F 3/1222 358/1.15 |
| 2015/0212761 A1* | 7/2015 | Onose | ................... | G06F 3/1204 358/1.15 |
| 2016/0277631 A1* | 9/2016 | Mori | ..................... | G06F 3/1239 |
| 2017/0272587 A1* | 9/2017 | Kondoh | ............... | G06F 3/1254 |
| 2018/0032708 A1* | 2/2018 | Mori | ..................... | G06F 21/608 |
| 2019/0004752 A1* | 1/2019 | Yamada | ............... | G06F 3/1267 |

FOREIGN PATENT DOCUMENTS

JP 5843691 B2 1/2016

* cited by examiner

*Primary Examiner* — Ted W Barnes
(74) *Attorney, Agent, or Firm* — Canon U.S.A., Inc. IP Division

(57) ABSTRACT

A printing apparatus determines one protocol from among a plurality of protocols to be used for acquisition and printing of a print job, based on at least two pieces of acquired information, and performs processing to acquire and print the print job using the determined protocol.

10 Claims, 18 Drawing Sheets

FIG.7A

701 — MANAGEMENT OF PRINTER OBJECT

[ADDITION OF REAL PRINTER OBJECT] [EDIT] [DELETE]

| | REAL PRINTER OBJECT NAME | SETUP LOCATION |
|---|---|---|
| ☐ | PRINTING APPARATUS 104 | 16F NORTH |
| ☐ | PRINTING APPARATUS 105 | 16F SOUTH |
| ☐ | PRINTING APPARATUS 106 | 18F NORTH |

[ADDITION OF VIRTUAL PRINTER OBJECT] [EDIT] [DELETE]

| | VIRTUAL PRINTER OBJECT NAME | COMMENT |
|---|---|---|
| ☐ | VIRTUAL PRINTER 001 | COLOR PRINTER |
| ☐ | VIRTUAL PRINTER 002 | MONOCHROME PRINTER |

702 — ADDITION OF REAL PRINTER OBJECT

SELECTION OF PRINTER TO BE ASSOCIATED

| | PRINTER NAME | SETUP LOCATION |
|---|---|---|
| ○ | PRINTING APPARATUS 101 | 16F NORTH |
| ○ | PRINTING APPARATUS 107 | 16F SOUTH |
| ○ | PRINTING APPARATUS 108 | 18F NORTH |

SELECTION OF PUBLICATION TARGET USER

| | PUBLICATION TARGET USERNAME/GROUP NAME |
|---|---|
| ☐ | Everybody |
| ☐ | alice@cloud.com |
| ☐ | bob@cloud.com |
| ☐ | carol@cloud.com |

[REGISTER] [CANCEL]

FIG.7B

703 — ADDITION OF VIRTUAL PRINTER OBJECT

VIRTUAL PRINTER OBJECT NAME: VIRTUAL PRINTER 003

COMMENT: FOR BUSINESS

PRINTER TO BE ASSOCIATED

| | PRINTER NAME | SETUP LOCATION |
|---|---|---|
| ☐ | PRINTING APPARATUS 101 | 16F NORTH |
| ☐ | PRINTING APPARATUS 107 | 16F SOUTH |
| ☐ | PRINTING APPARATUS 108 | 18F NORTH |

SELECTION OF PUBLICATION TARGET USER

| | PUBLICATION TARGET USERNAME/GROUP NAME |
|---|---|
| ☐ | Everybody |
| ☐ | alice@cloud.com |
| ☐ | bob@cloud.com |
| ☐ | carol@cloud.com |

[REGISTER] [CANCEL]

---

704 — USER AUTHENTICATION SETTING FROM PRINTER

705 — ☐ VALIDATE IC CARD AUTHENTICATION FROM REGISTERED PRINTING APPARATUS

706 — ☐ VALIDATE AUTHENTICATION ONLY WITH ACCOUNT NAME FROM REGISTERED PRINTING APPARATUS

[REGISTER] [CANCEL]

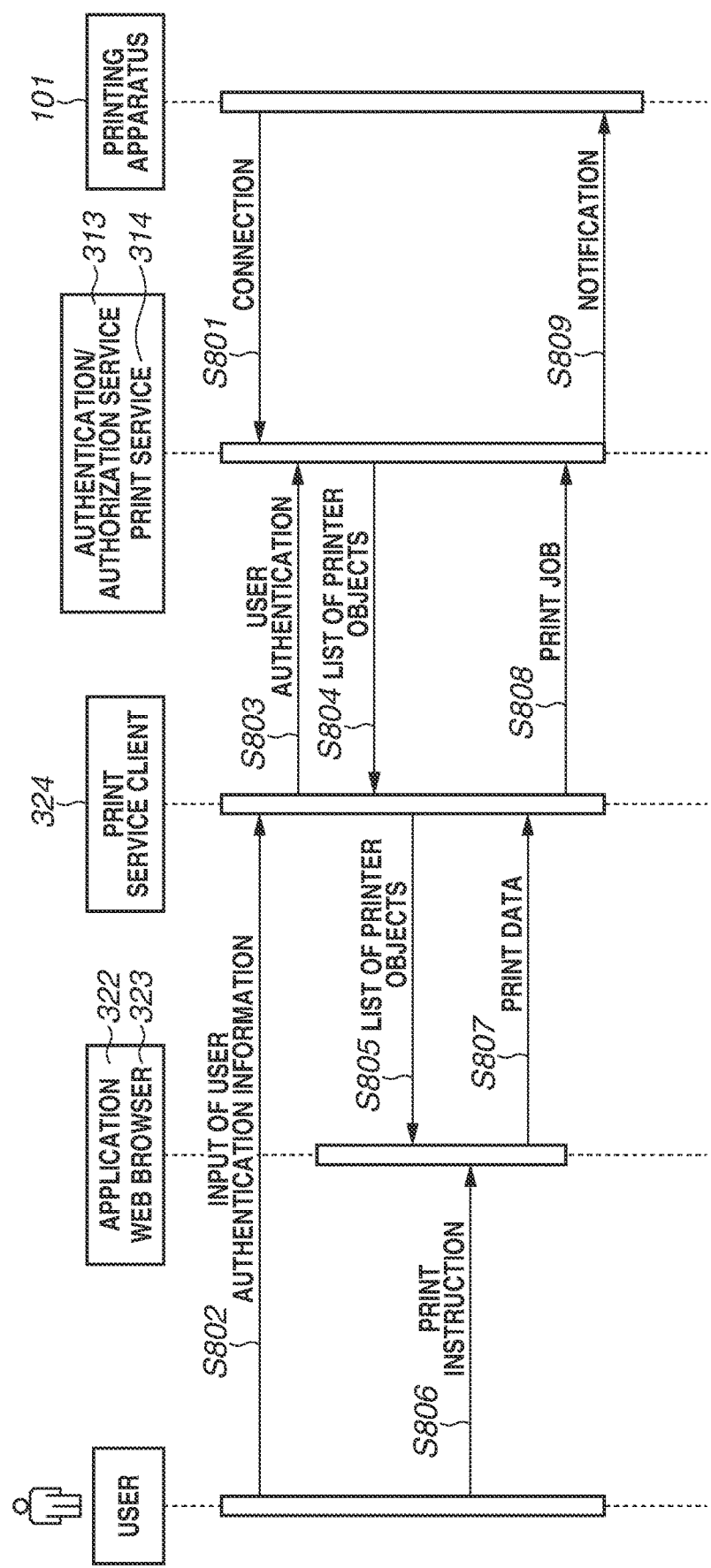

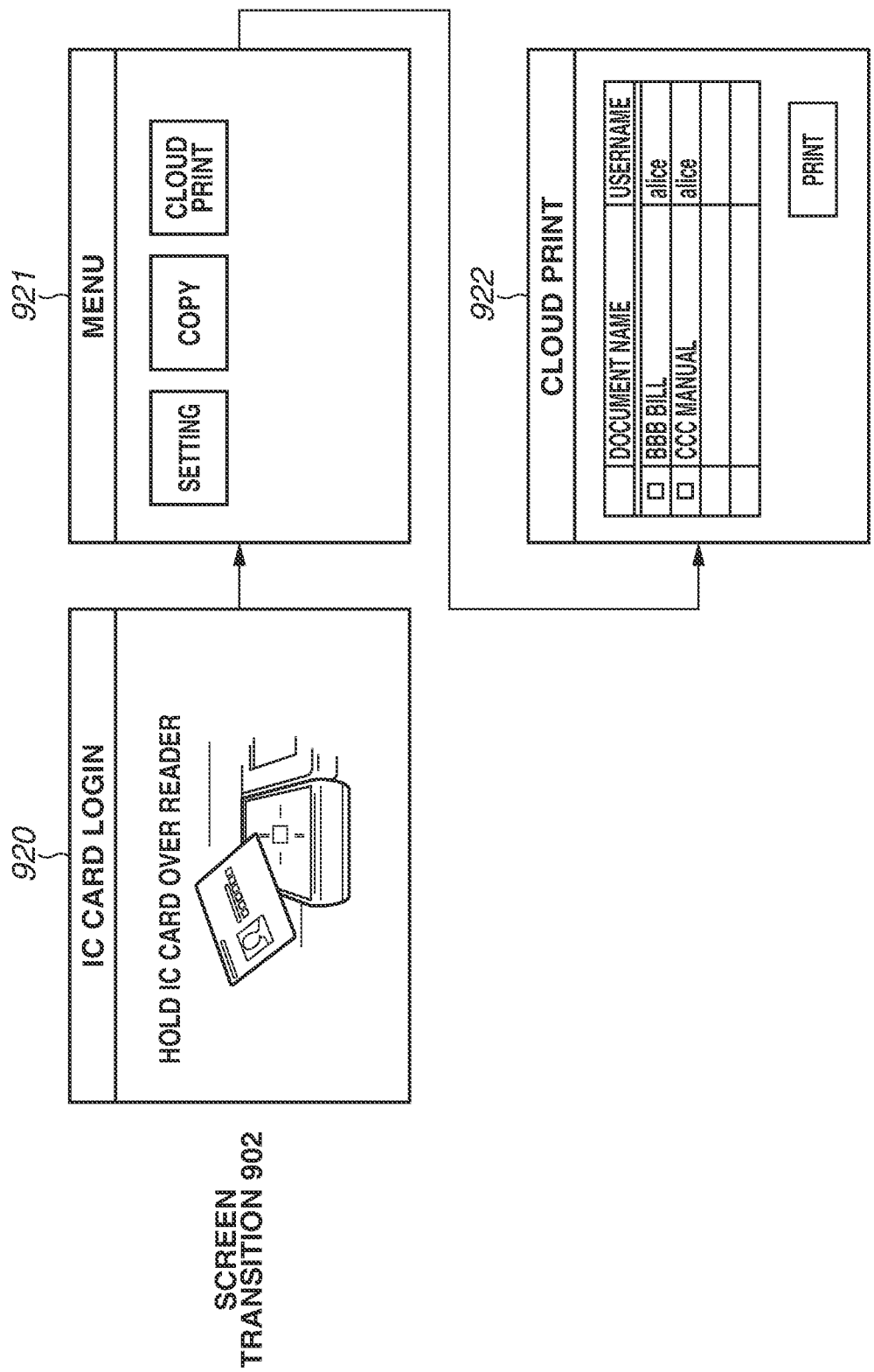

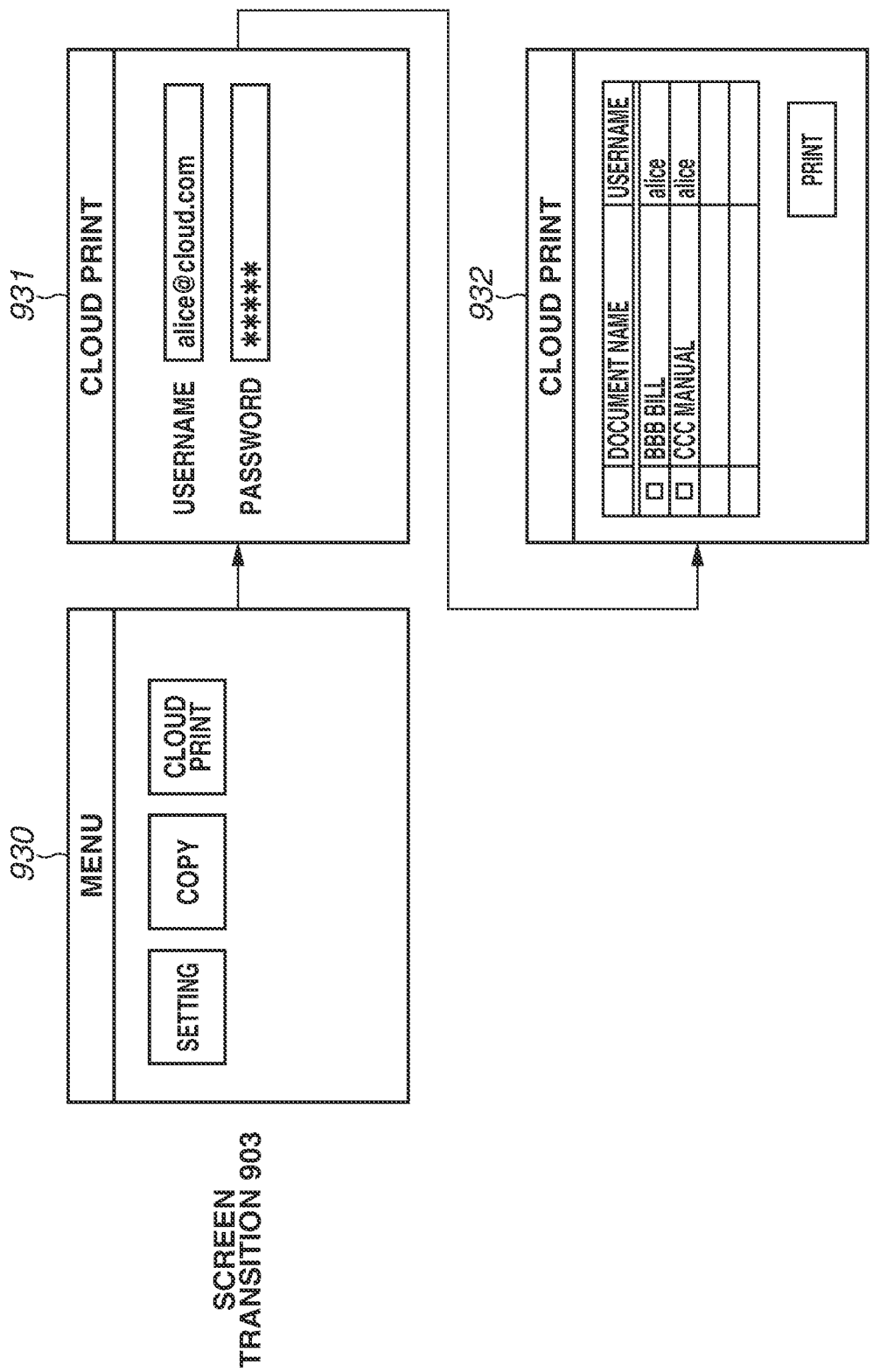

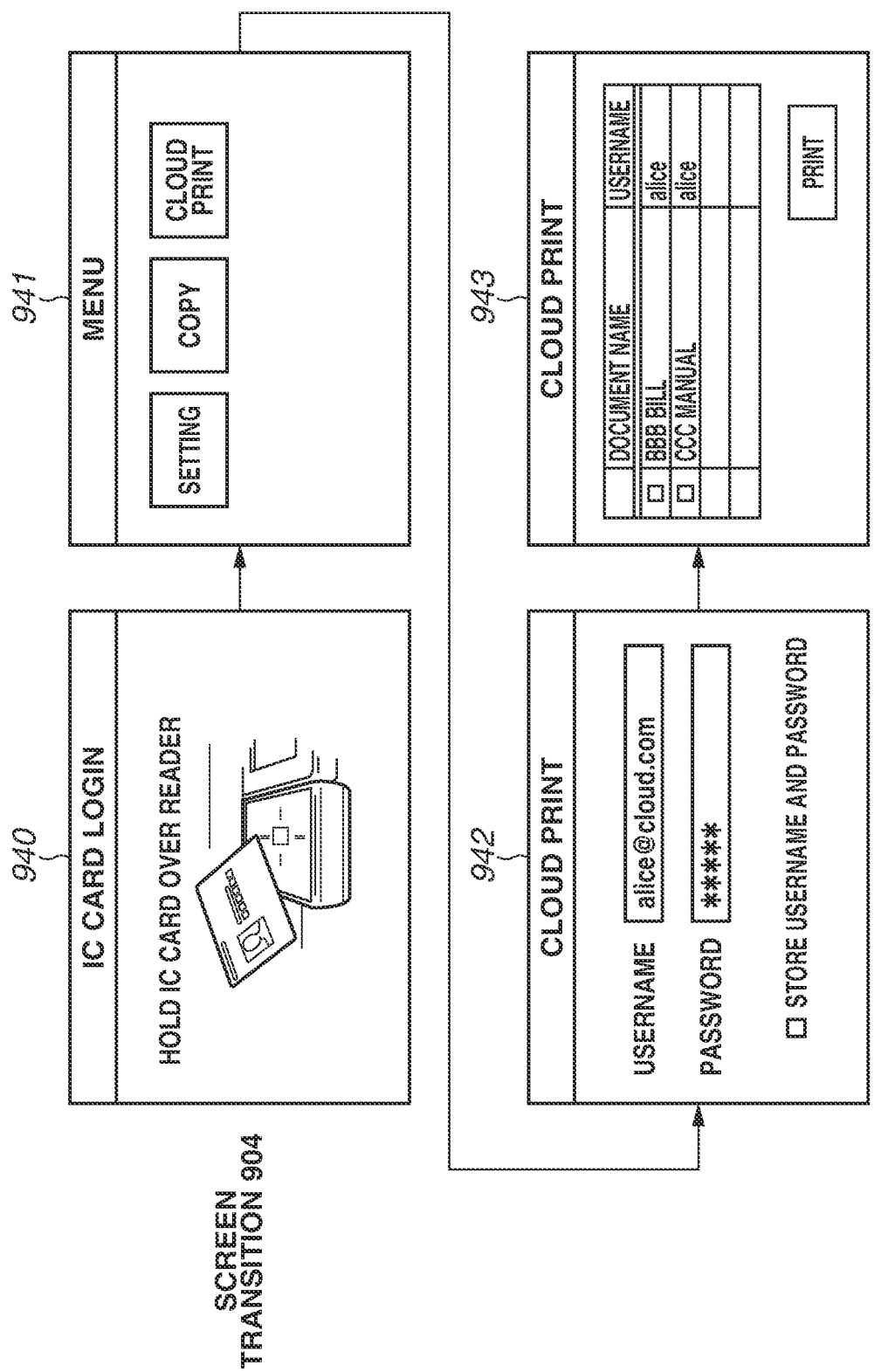

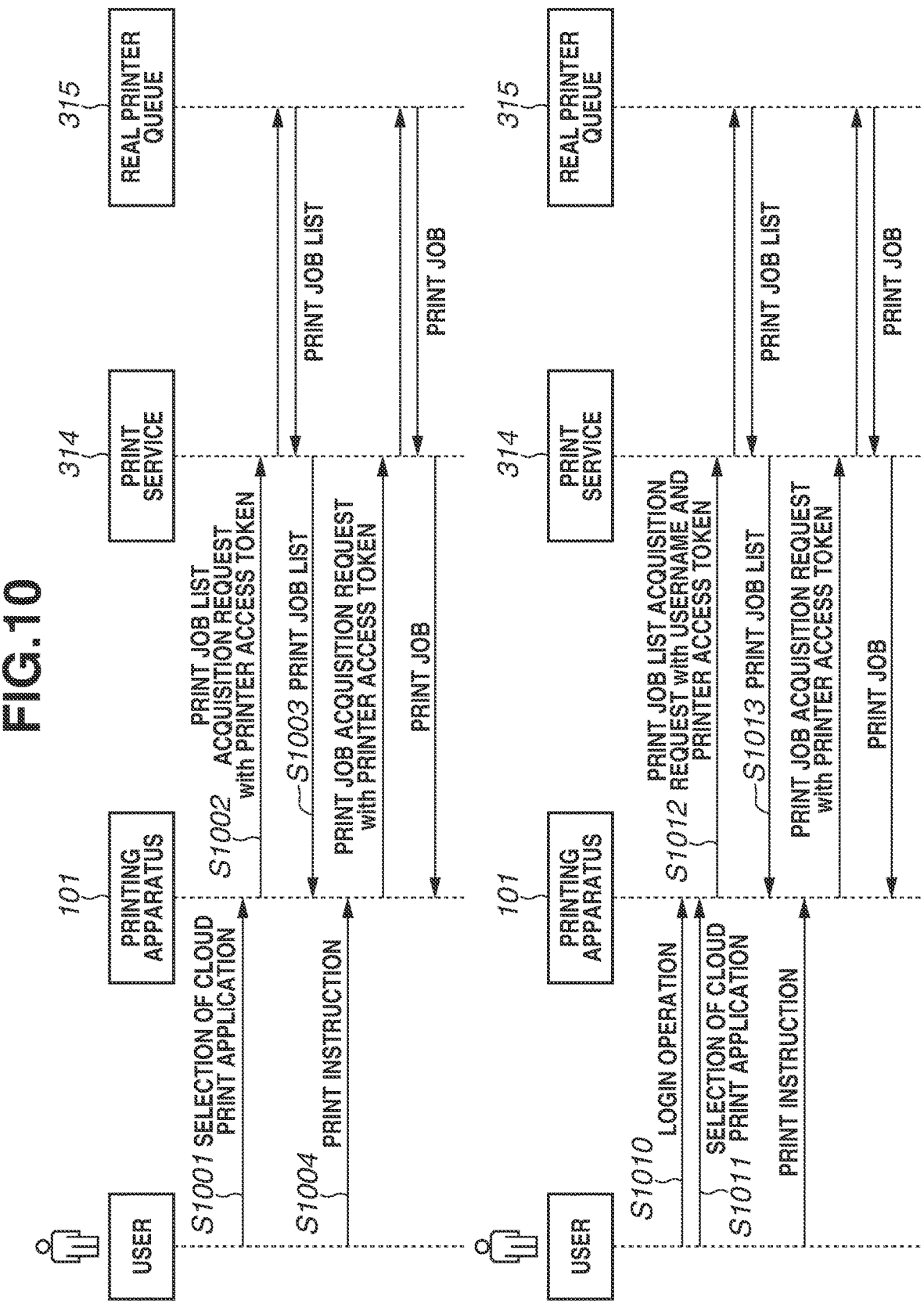

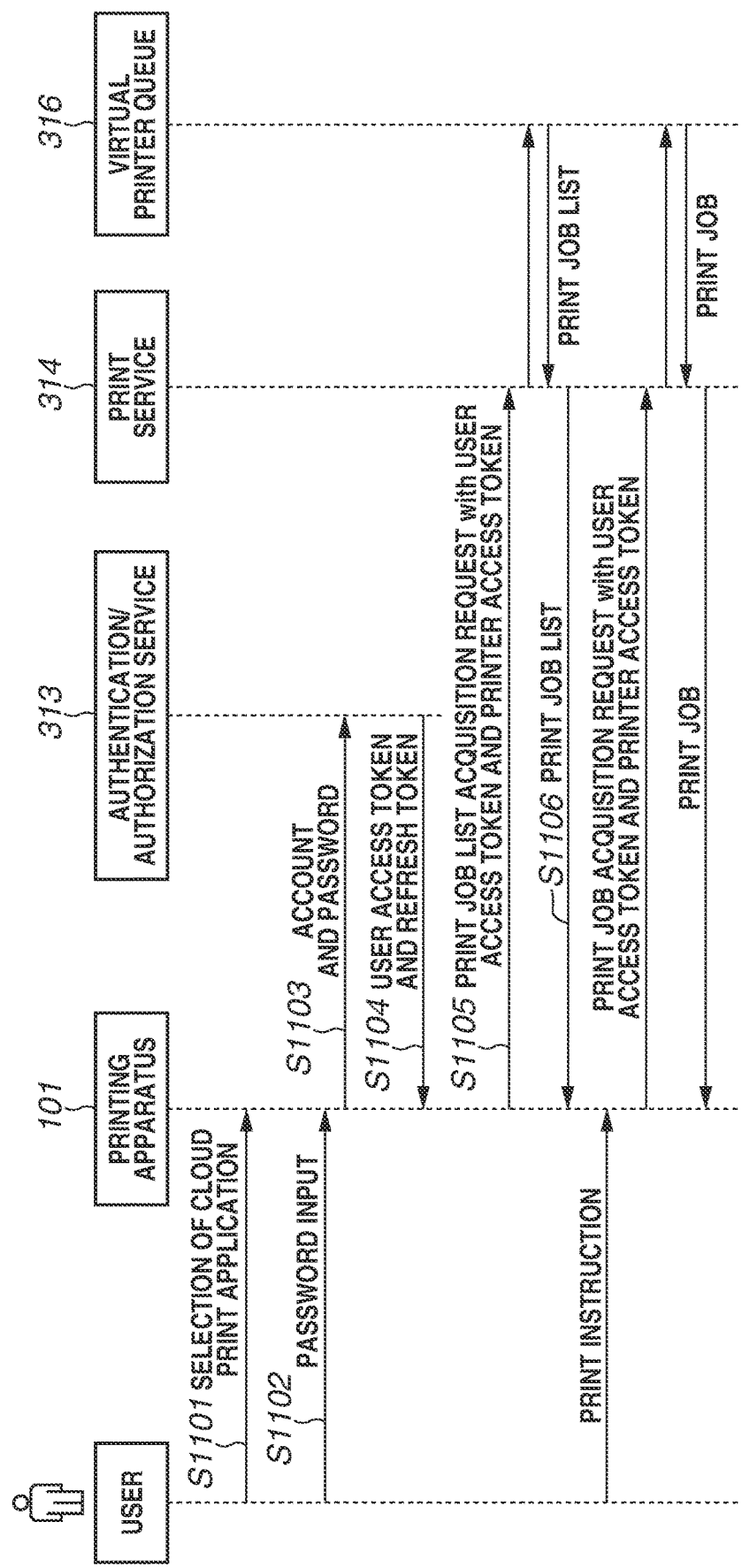

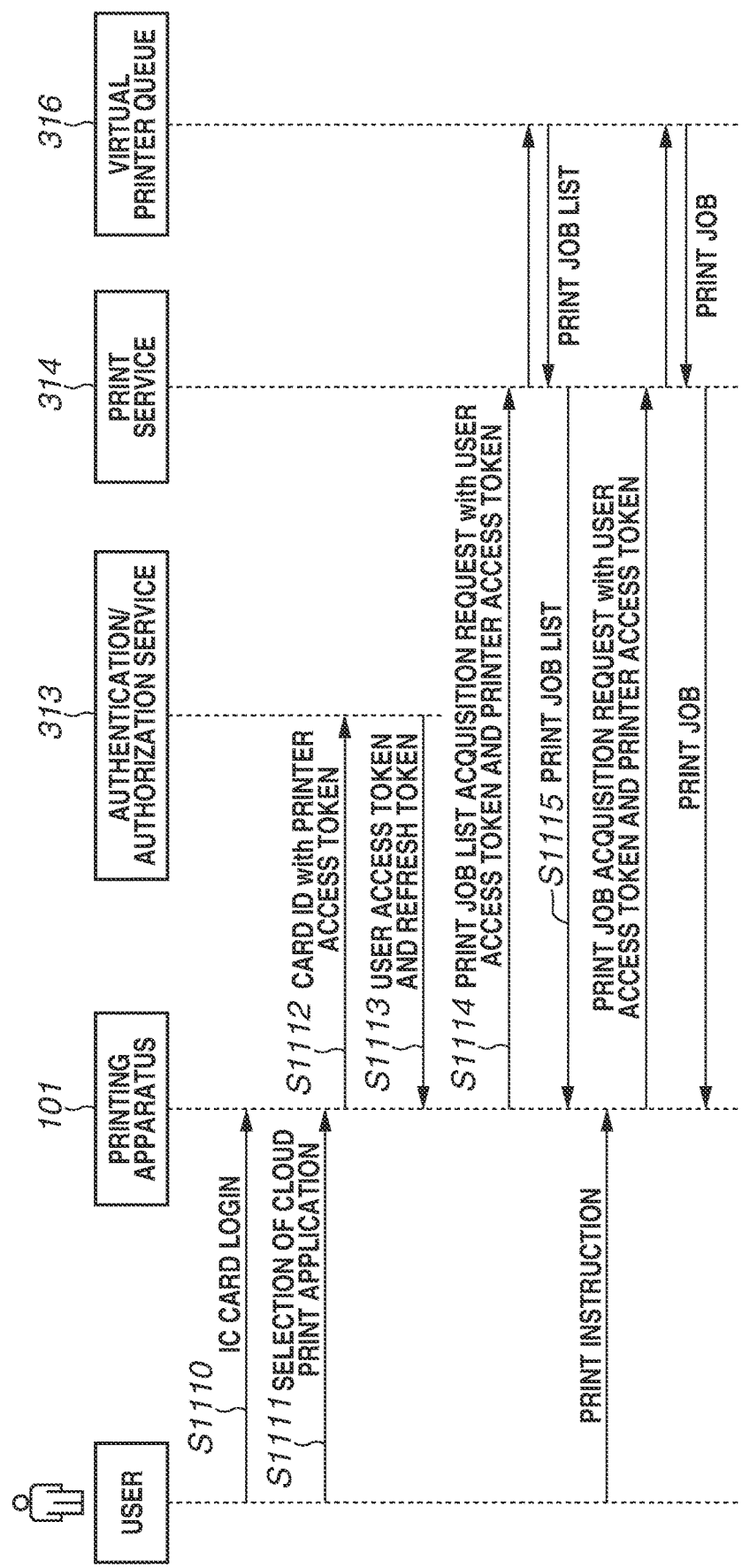

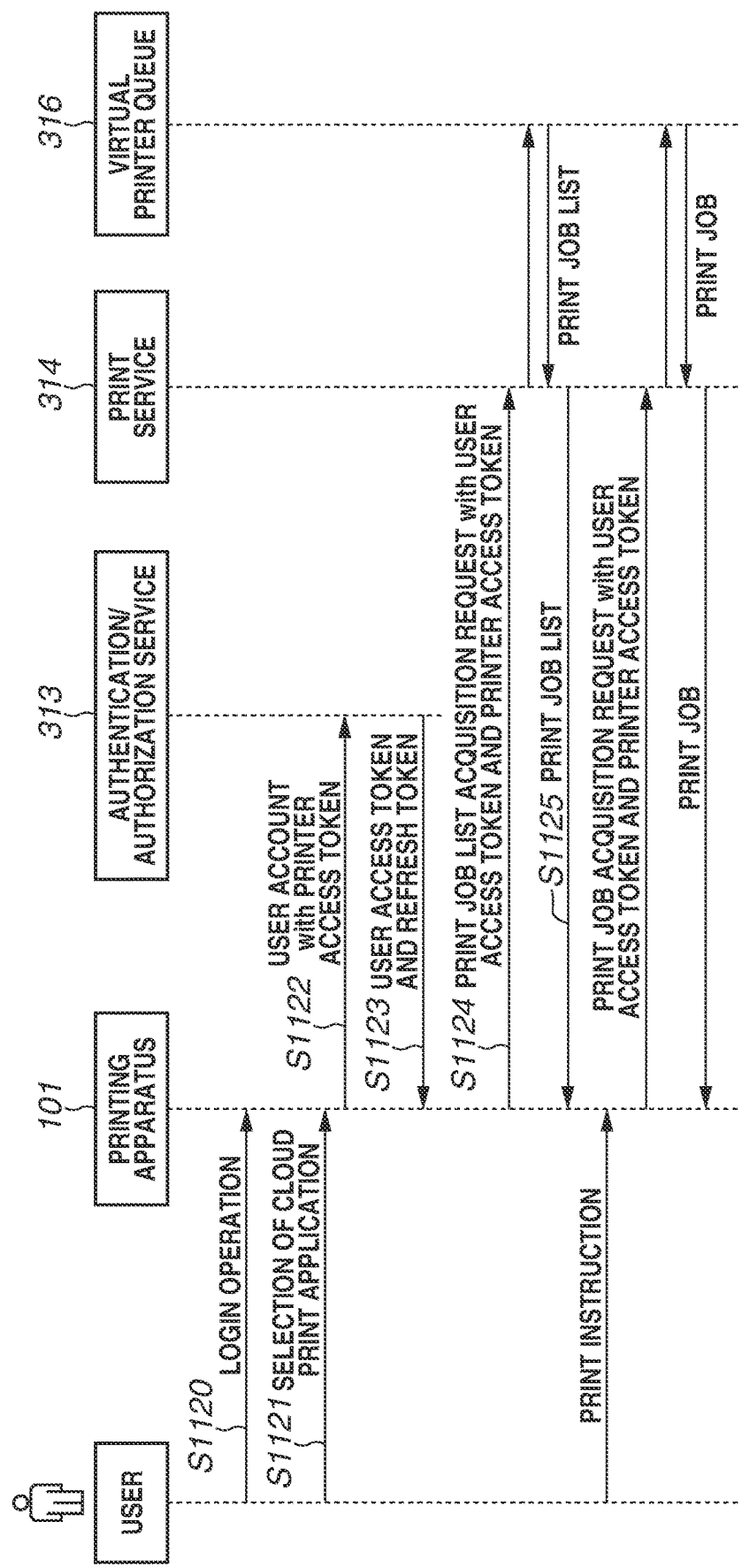

PRINTING APPARATUS SUPPORTING CLOUD PRINT SERVICE, METHOD OF CONTROLLING PRINTING APPARATUS, AND STORAGE MEDIUM

BACKGROUND

Field of the Disclosure

The present disclosure relates to a printing apparatus supporting a cloud print service, a method of controlling the printing apparatus, and a storage medium.

Description of the Related Art

In recent years, there have been cloud print services that are provided by servers on the Internet. Printers are registered in the cloud print services, and the registered printer acquires print data output in response to an instruction from a user terminal via the cloud print service to perform printing.

When the cloud print service is used from a user terminal, a user may have a choice between two types of print modes. In one print mode, a user designates a printer object associated with a physical printer one-to-one when issuing a printing instruction. In the other print mode, a user designates a printer object associated with a physical printer one-to-N when issuing a printing instruction. The former printer object is referred to as a real printer object, and the latter printer object is referred to as a virtual printer object. A temporary storage area on the cloud service for the print data input with designation of the real printer object is referred to as a real printer queue. A temporary storage area on the cloud service for the print data input with designation of the virtual printer object is referred to as a virtual printer queue. As discussed in Japanese Patent No. 05843691, print data stored in the virtual printer queue can be accessed from any printer associated with the virtual printer object and can be printed out. The print mode using such a virtual printer queue is referred to as Anywhere Print.

Some cloud print services may be provided by vendors different from printer vendors. For example, Google LLC provides a cloud print service called Google Cloud Print® and printer vendors provide printers each supporting Google Cloud Print®.

To support cloud print services of different vendors, printer vendors introduce printers supporting a plurality of protocols specified by cloud services of different vendors to the market.

SUMMARY

According to embodiments of the present disclosure, a printing apparatus includes a printing function and an authentication function. The printing function achieves cloud print by performing processing to register the printing apparatus on a print service connected via the Internet and processing to acquire a print job from a printer queue of the print service, and the authentication function authenticates a user to limit use of a function. The printing apparatus includes an acquisition unit configured to acquire, from the print service, information relating to a printer queue type associated with the registered printing apparatus, and to acquire, from the authentication function of the printing apparatus, information relating to whether to validate or invalidate the authentication function, and a determination unit configured to determine one protocol from among a plurality of protocols to be used for acquisition and printing of the print job, based on at least two pieces of information acquired by the acquisition unit. Processing to acquire and print the print job is performed using the protocol determined by the determination unit.

Further features of the present disclosure will become apparent from the following description of exemplary embodiments with reference to the attached drawings.

BRIEF DESCRIPTION OF THE DRAWINGS

FIGS. 7A and 7B are diagrams illustrating user interfaces provided by the print service.

FIG. 8 is a diagram illustrating processing procedure when printing is performed from a user terminal.

FIGS. 9A, 9B, 9C and 9D are diagrams each illustrating screen transition when a user logs in to the printing apparatus.

FIG. 10 is a diagram illustrating a flow to acquire a print job from a real printer queue.

FIGS. 11A, 11B, and 11C are diagrams each illustrating a processing procedure to acquire a print job from a virtual printer queue.

DESCRIPTION OF THE EMBODIMENTS

A plurality of protocols may be provided depending on, for example, a print mode (real printer queue and virtual printer queue), an authentication method, a utilization method, even among cloud print services provided by the same vender.

Printers are required to support the plurality of protocols and also required to select an appropriate protocol from among the plurality of protocols to operate after determining a setting of a cloud print service and a mode of use by a user. Therefore, in a case where a user interface is provided to allow a user using the printer to select a protocol, performing a setting becomes troublesome for the user.

Embodiments of the present disclosure are directed to a printer that uses an appropriate protocol to acquire print data when the print data is acquired from the cloud print service, and thereby has high availability.

Some exemplary embodiments of the present disclosure are described below with reference to drawings.

Figure 1:
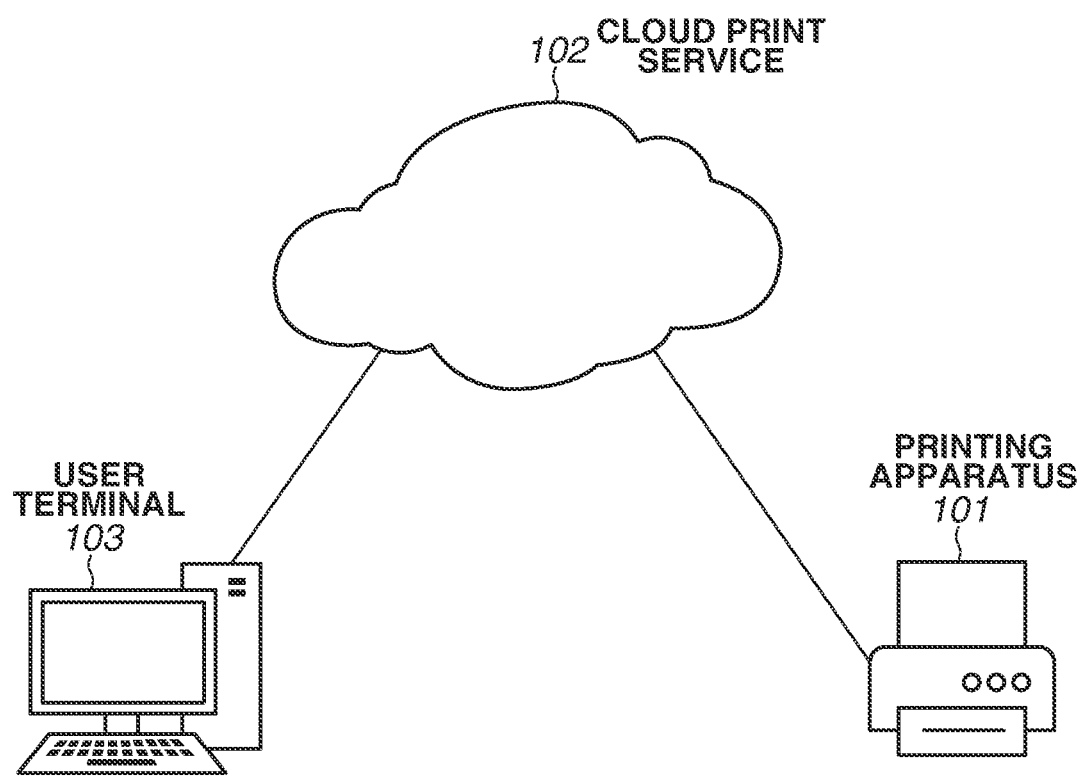
FIG. 1 is a diagram illustrating a system configuration according to an exemplary embodiment.

FIG. 1 is a configuration diagram illustrating a print system including a printing apparatus 101 according to a first exemplary embodiment. The printing apparatus (printer) 101 includes a printing function for cloud print. A cloud print service 102 is provided on the Internet and is a web server. The print system also includes a user terminal 103. The printing apparatus 101 is registered in advance in the cloud print service 102 by an owner of the printing apparatus 101. A user uses the user terminal 103 to select an object associated with the printing apparatus 101 registered in the cloud print service 102, and transmits print data to the cloud print service 102. The printing apparatus 101 receives the print data transmitted by the user via the cloud print service 102, and performs printing. Although not illustrated, the user terminal is not limited to the user terminal 103. The cloud print service 102 can be also used from a plurality of user terminals, such as a general-purpose personal computer and a smartphone. The printing apparatus 101 and the user terminal 103 are connected to the cloud print service 102 via the Internet. Further, although not illustrated, a plurality of printing apparatuses each including a configuration similar to the configuration of the printing apparatus 101 is connected to the user terminal 103 and the cloud print service 102 via the Internet.

<Hardware Configuration of Printing Apparatus>

Figure 2:
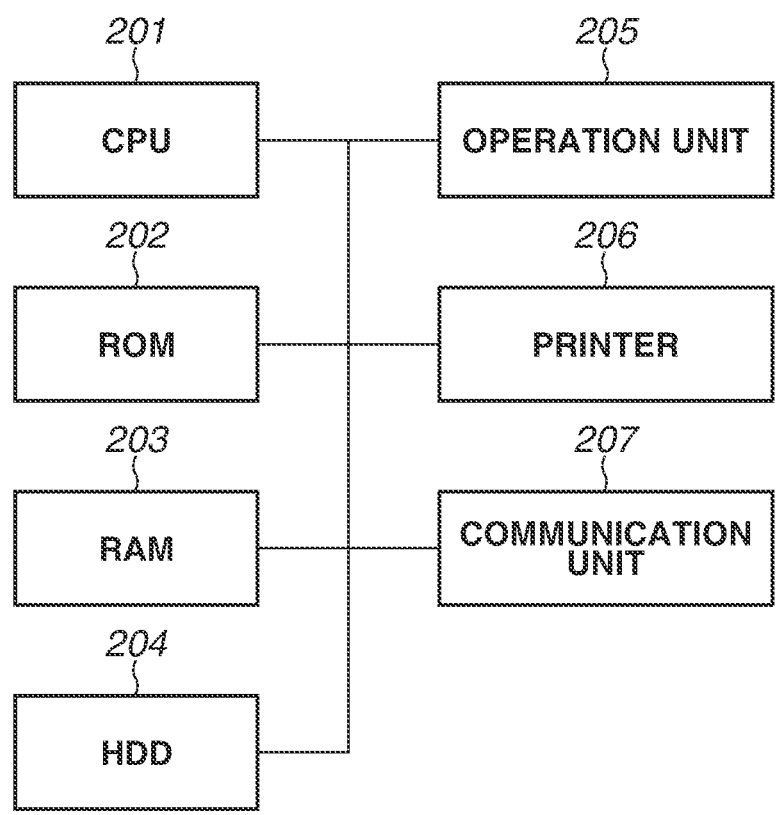
FIG. 2 is a diagram illustrating a hardware configuration of a printing apparatus.

FIG. 2 is a simplified diagram illustrating a hardware configuration of the printing apparatus 101.

A central processing unit (CPU) 201 is a processor controlling entire operation of the printing apparatus 101 as a multifunctional peripheral. A random access memory (RAM) 203 is a volatile memory, and is used as a work area and a temporary storage area in which various kinds of control programs stored in a read-only memory (ROM) 202 and a hard disk drive (HDD) 204 are developed.

The ROM 202 is a nonvolatile memory, and stores a boot program of the multifunctional peripheral, etc. The HDD 204 is a nonvolatile hard disk that has a capacity larger than a capacity of the RAM 203. The HDD 204 stores a control program of the multifunctional peripheral. An operating system (OS) and application programs are also stored in the HDD 204.

At startup of the multifunctional peripheral, the CPU 201 executes the boot program stored in the ROM 202. Using the boot program, a program of the OS stored in the HDD 204 is read out and developed on the RAM 203. After execution of the boot program, the CPU 201 subsequently executes the program of the OS developed on the RAM 203 to control the multifunctional peripheral. Further, the CPU 201 stores data to be used for an operation by the control program, on the RAM 203 and performs reading and writing of the data.

While, in the multifunctional peripheral, one CPU 201 executes processing illustrated in a flowchart described below, the multifunctional peripheral has the other configuration. For example, a plurality of CPUs and microprocessor units (MPUs) may cooperate with each other to execute the processing illustrated in the flowchart described below. A part of the processing described below may also be executed by a hardware circuit, such as an application specific integrated circuit (ASIC) and a field-programmable gate array (FPGA).

An operation unit 205 is a touch-type display.

A printer 206 is a printer engine that prints print data received from outside via a communication unit 207.

The communication unit 207 is a network interface for connecting to the Internet and a local area network (LAN) in an office.

Each of the user terminal 103 and the cloud print service 102 also has a similar hardware configuration including the CPU 201, the ROM 202, the RAM 203, and the HDD 204.

An integrated circuit (IC) card reader 208 reads out information to be used for user authentication from an IC card, and is provided for IC card authentication.

<Software Configuration>

Figure 3:
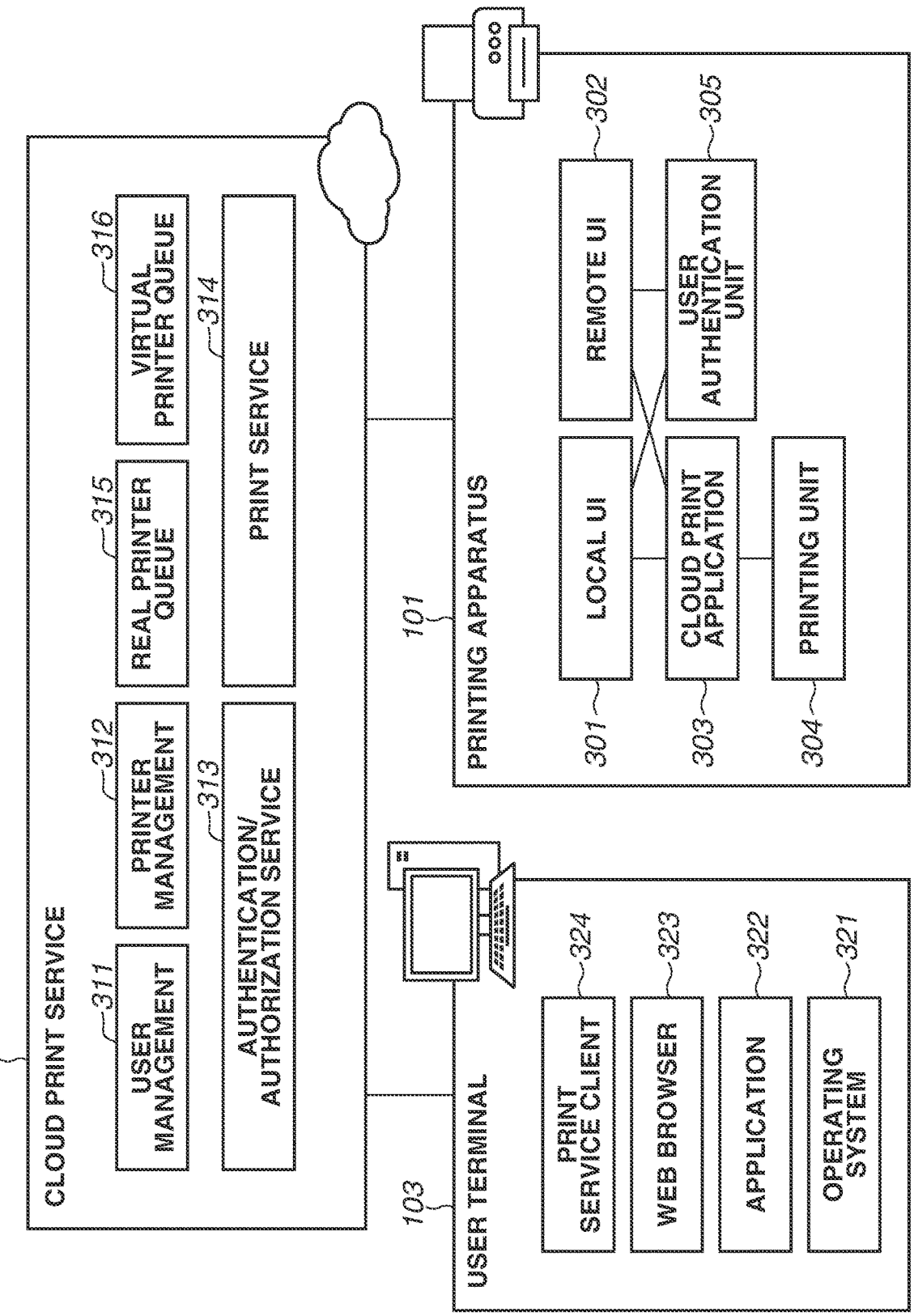
FIG. 3 is a diagram illustrating a software configuration.

FIG. 3 is a simplified diagram illustrating a software configuration of each of the printing apparatus 101, the cloud print service 102, and the user terminal 103.

<Software Configuration of Printing Apparatus 101>

The software configuration of the printing apparatus 101 is described.

Figure 4:
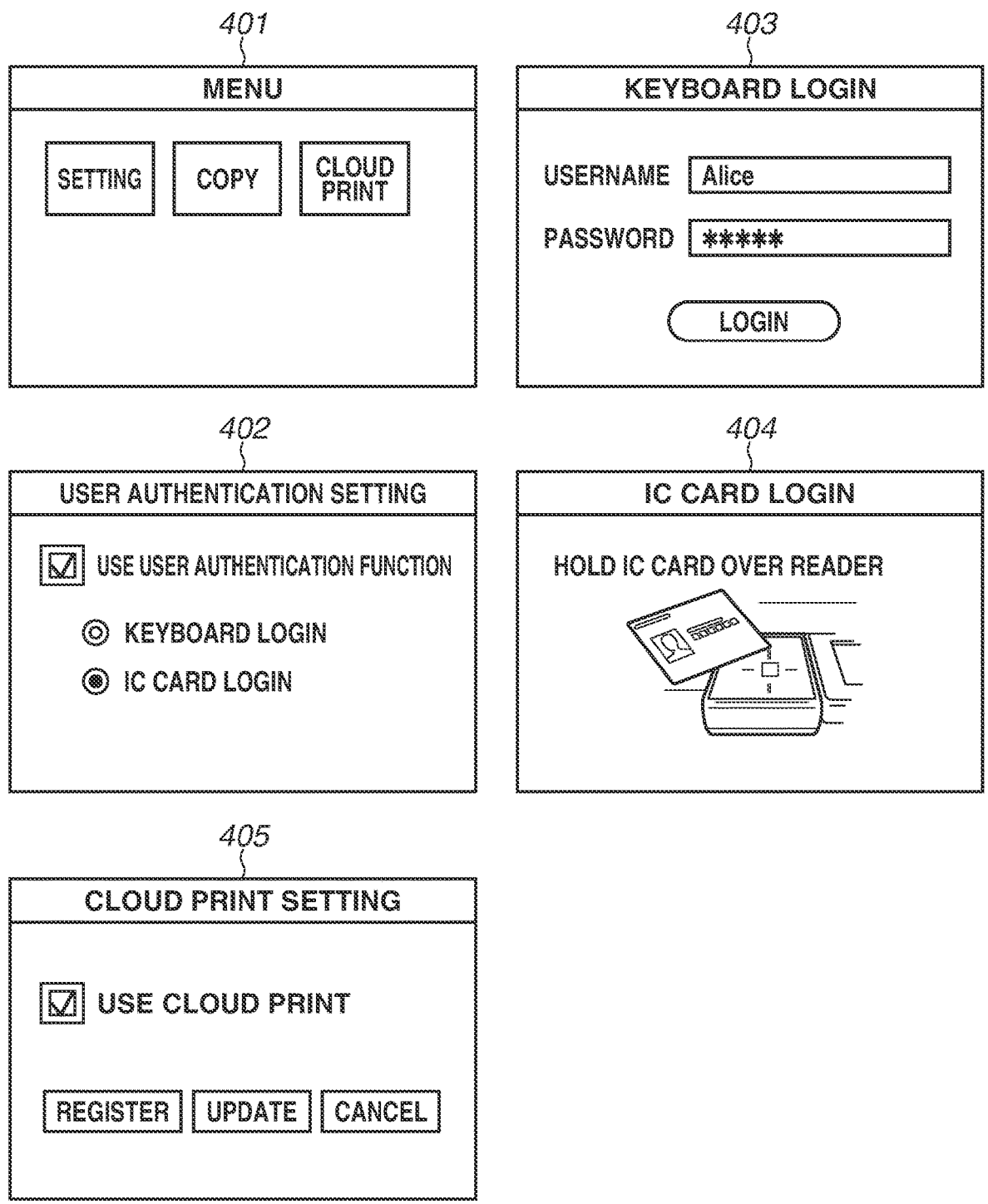
FIG. 4 is a diagram illustrating a user interface displayed on an operation unit the printing apparatus.

A local user interface (UI) 301 of the printing apparatus 101 uses a display of the operation unit 205 to provide a user interface. The user uses the interface to change a setting of the printing apparatus 101 and to use a function of the printing apparatus 101. FIG. 4 illustrates an example of the user interface provided by the local UI 301. A remote UI 302 includes a hypertext transfer protocol (HTTP) server function, and provides a user interface configured by hypertext markup language (HTML) to the user. The user accesses the remote UI 302 using a web browser of the user terminal, to change a setting of the printing apparatus 101 and use a function of the printing apparatus 101. A cloud print application 303 is a software module that implements communication protocol and a function for supporting the cloud print service 102. When the cloud print application 303 receives a print job from the cloud print service 102, a printing unit 304 controls the printer 206 to perform print processing. A user authentication unit 305 is a software module that authenticates a user using the local UI 301 and the remote UI 302, and can limit use of each function provided by the printing apparatus 101. Accounts of an administrator and general users can be registered on the HDD 204 via the user interface such as the local UI 301 and the remote UI 302. An example of account information stored in the HDD 204 will be described using Table 1. As the account information, a username, a password, a card identification (ID) of an IC card, and a role (administrator/general user) can be registered on the HDD 204. An account of the cloud print service 102 can be managed in association with an account of the printing apparatus 101.

TABLE 1

| Username | Password | Card ID | Role | User account of cloud print service |
|---|---|---|---|---|
| Administrator | ***** | ABC123456 | Administrator | admin@cloud.com |
| Alice | ***** | ABC123457 | General user | alice@cloud.com |
| Bob | ***** | ABC123458 | General user | bob@cloud.com |
| Carol | ***** | ABC123459 | General user | carol@cloud.com |

In a factory setting of the printing apparatus 101, a user authentication function is invalid. When the printing apparatus 101 is started up, the local UI 301 displays a menu screen 401. The user can display a user authentication setting screen 402 via the menu screen 401. In the user authentication setting screen 402, valid/invalid of the user authentication function is selectable. In a case where valid of the user authentication function is selected, a keyboard login function and an IC card login function are further selectable. The setting performed by the user is stored in the HDD 204, and the user authentication unit 305 can refer to the setting. In a case where the keyboard login function is selected, the local UI 301 displays a keyboard login screen 403, and authenticates the user using the menu screen 401. Keyboard login screen 403 displays a software keyboard, and receives input of a username and a password from the user. The user authentication unit 305 acquires the username and the password acquired from the screen, and performs user authentication by comparing the acquired username and the acquired password with the account information (Table 1) registered on the HDD 204. When the authentication is successful, the user authentication unit 305 allows the authenticated user to log in to the printing apparatus 101. More specifically, the user authentication unit 305 instructs the local UI 301 to close the login screen and to transit to the menu screen 401. In a case where the IC card login function is selected, the local UI 301 displays an IC card login screen 404, and authenticates the user using the menu screen 401. During display of the IC card login screen 404, the IC card held over the IC card reader 208 is detected, and the card ID is read out from the IC card. The user authentication unit 305 searches the account information (Table 1) registered on the HDD 204 for an account coinciding with the card ID acquired from the IC card reader 208. In a case where the account coinciding with the card ID is found, the user authentication unit 305 allows the user having the coinciding card ID to log in to the printing apparatus 101.

The user authentication unit 305 stores information on the login user in an object that is referred to as a login context, and transmits the login context to other software modules such as the cloud print application 303. An example of the information stored in the login context is Table 2. The username and the role of the login user managed in Table 1 are stored in the login context. In a case where a user logs in to the printing apparatus 101 using an IC card, the card ID is stored in the login context. In a case where a user logs in to the printing apparatus 101 using a username and a password, a card ID is not stored. Further, the account of the cloud print service 102 stored in Table 1 in association with the username is stored in the login context.

TABLE 2

| Item | Value |
|---|---|
| Login username | Alice |
| Role | General user |
| Card ID used for login | ABC123457 |
| User account of cloud print service | alice@cloud.com |

The user terminal 103 also includes a web browser that displays a screen based on an HTML received as a response of a HTML request. The cloud print service 102 also includes a function of registering the printing apparatus 101, a function of converting print data, which is designated by the user terminal 103 for printing, into a print job, and a function of transmitting the print job to the selected printing apparatus 101.

The local UI 301 and the remote UI 302 provide a user interface 405. The user uses the user interface 405 to register the printing apparatus 101 on the cloud print service 102, update the registration, and cancel the registration.

<Software Configuration of Cloud Print Service 102>

The software configuration of the cloud print service 102 is described. The cloud print service 102 includes a website in which an administrator performs a setting for a service. FIGS. 7A and 7B are diagrams illustrating examples of user interfaces of the website provided by the cloud print service 102.

A user management 311 includes a database and a user interface. The database manages an account of a user accessing the cloud print service 102, and the user interface is used for registration, edit, and deletion of the account. An example of the user account information that is stored in the database and is managed by the user management 311 is Table 3. As the account information, a user account name, a password, a card ID of an IC card, and a role (administrator/general user) can be registered on the database.

TABLE 3

| User account name | Password | Card ID | Role |
|---|---|---|---|
| admin@cloud.com | ***** | ABC123456 | Administrator |
| alice@cloud.com | ***** | ABC123457 | General user |
| bob@cloud.com | ***** | ABC123458 | General user |
| carol@cloud.com | ***** | ABC123459 | General user |

A printer management 312 includes a database and a user interface. The database manages information on a printer registered on the cloud print service 102, and the user interface is used for registration, edit, and deletion of the printer information. An authentication/authorization service 313 authenticates a user attempting to log in to the website provided by the cloud print service 102. The authentication/authorization service 313 further includes a protocol that authenticates a user and a printer accessing the cloud print service 102 to issue a user ID token and an access token. The protocol is, for example, OpenID Connect standardized by Open ID Foundation or OAuth 2.0 specified by RFC 6749. A print service 314 communicates with the user terminal 103 and the printing apparatus 101. The print service 314 includes a protocol that performs transmission/reception of the print job, settings relating to printing, and notification of an event. Further, the print service 314 includes a user interface that creates a real printer object and a virtual printer object to publicize the real printer object and the virtual printer object to the user terminal 103.

A real printer queue 315 is a print job storage area that temporarily stores a print job transmitted when the real printer object is designated by the user terminal 103. A virtual printer queue 316 is a print job storage area that temporarily stores the print job transmitted when the virtual printer object is designated by the user terminal 103. The printer queues are prepared when the print object is created, or are associated with previously-prepared printer queues.

<Software Configuration of User Terminal 103>

The software configuration of the user terminal 103 is described. The user terminal 103 includes software, such as an operating system 321, an application 322, a web browser 323, and a print service client 324. The print service client 324 is a communication client to be used for the cloud print service 102.

The function of the print service client 324 may be provided in each of the application 322 and the web browser 323. The operating system 321 may include the function of the print service client 324, and may provide the function to the application 322 and the web browser 323. A print driver (not illustrated) installed in the user terminal 103 may include the function of the print service client 324.

<Processing Procedure for Registering Printing Apparatus 101>

Figure 5:
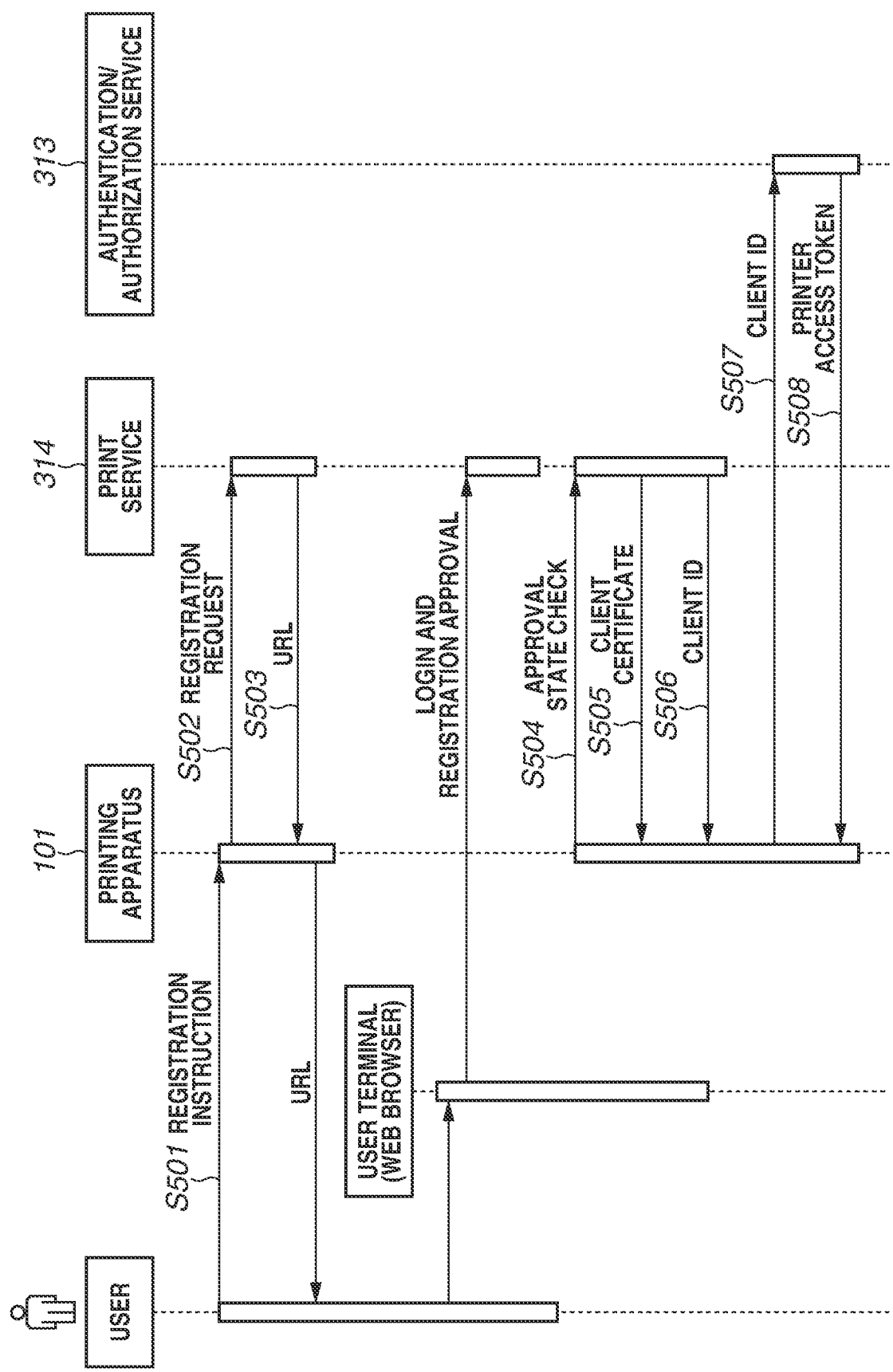
FIG. 5 is a diagram illustrating a sequence to register the printing apparatus to a print service.

A processing procedure for registering the printing apparatus 101 on the cloud print service 102 is described with reference to FIG. 5.

In response to a user logging in to the printing apparatus 101 from the local UI 301, the user interface 405 for setting the cloud print is displayed. In step S501, the user instructs registration by pressing a registration button. The cloud print application 303 of the printing apparatus 101 detects the pressing of the registration button, generates a pair of a public key and a private key, and generates a certificate signing request (CSR). The CSR is a message format of a certificate signing request to be transmitted from an applicant to a certification authority for application of a public key certificate. The CSR includes information for identification of the applicant and the generated public key. The information for identification of the applicant included in the CSR includes a common name, an organization name, a division name, an address, and a country code. The printing apparatus 101 uses a printer name "printing apparatus 101" as the common name. As the organization name, the division name, the address, and the country code, default values stored in the printing apparatus 101 at shipment from a factory are used.

In step S502, the printing apparatus 101 transmits a registration request together with the CSR to the print service 314. The registration request includes information on the printing apparatus 101. Examples of the information on the printing apparatus 101 include a printer name, a model name, an installed location, a mounted unit, and information relating to printing capability, such as monochrome/color printing. In step S503, the print service 314 generates a registration uniform resource locator (URL) for the printing apparatus 101 in response to reception of the registration request, and returns the registration URL to the printing apparatus 101. The printing apparatus 101 has not been registered on the cloud print service 102 yet at this time. Upon receiving printer registration from the printing apparatus 101, the print service 314 issues a client certificate described below.

The information included in the client certificate that is issued from the cloud print service 102 to the printing apparatus 101 is illustrated in the following table.

TABLE 4

| Item | Value |
| --- | --- |
| Version | V3 |
| Serial number | 123456789 |
| Issuer | CN = Cloud print service 102 |
| User identifier | CN = Printing apparatus 101 |
| Start of valid period | Jan. 20, 2018 |
| End of valid period | Jan. 20, 2020 |
| Public key | 30 82 01 0a 02 . . . |
| Signature algorithm | SHA256-RSA |
| Signature | 36 79 ca 35 66 87 72 . . . |

The version indicates X509 that is a format of the certificate. The serial number is provided for the certificate issued by the print service 314. The issuer is an identifier of the print service 314 as an issuer of the certificate. The user identifier is for identifying the printing apparatus 101 as a certificate issuance requester. The start of the valid period represents a use start date of the certificate. The end of the valid period represents an expiration date when the valid period of the certificate expires. In the following description, the end of the valid period is simply referred to as the expiration date. The public key is included in the CSR by the printing apparatus 101. The signature algorithm is used for a signature of the certificate. The signature is a digital signature provided for the certificate by the print service 314 as the issuer. The signature is signed with the private key held by the print service 314.

While, in the first exemplary embodiment, the example case where the print service 314 includes a certificate issuing function has been described, the print service 314 may use a certificate issuing service of a third party to issue a certificate. In a case where the print service 314 uses the certificate issuing service of the third party, the identifier and the signature of the issuer are the identifier and the signature of the certification issuing service of the third party.

The printing apparatus 101 displays the received URL on the local UI 301 to prompt the user to access the URL for registration of the printing apparatus 101. A quick response code (QR Code®) encoded from the URL may be displayed and read by a camera of a smartphone, etc. Alternatively, the printing apparatus 101 instructs the printing unit 304 to print the URL or the QR Code® and outputs the URL or the QR Code® to a sheet.

Figure 6:
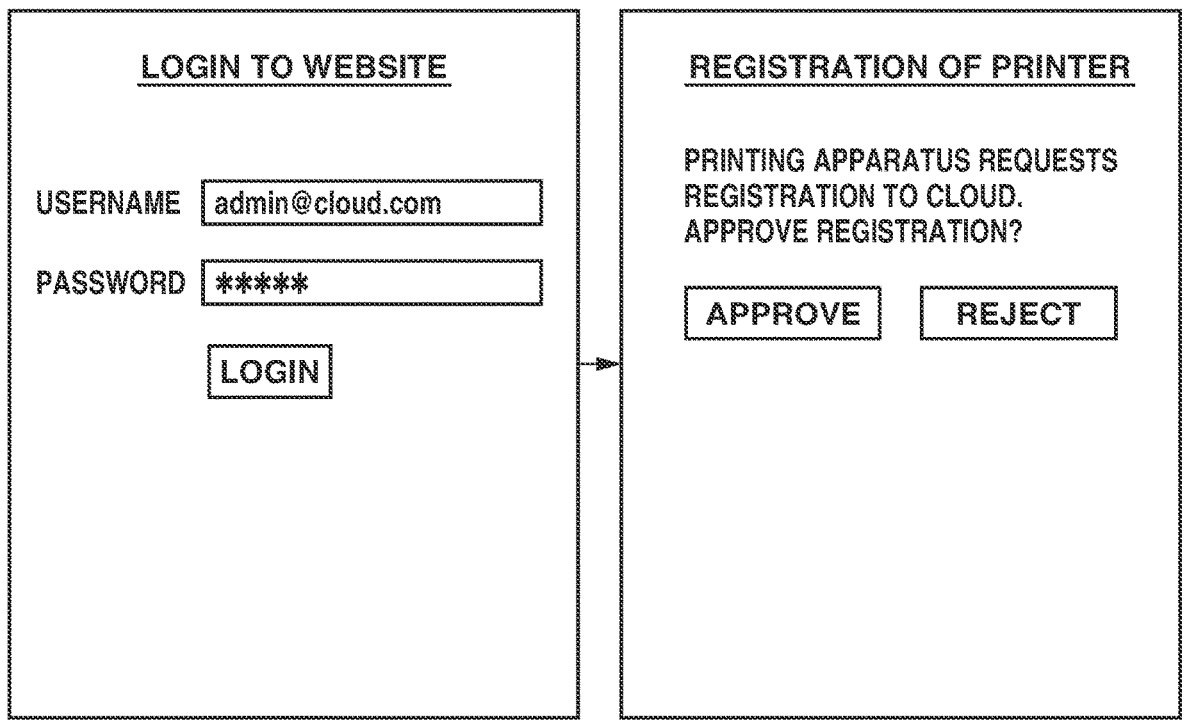
FIG. 6 is a diagram illustrating a user interface of the print service that approves registration.

The user accesses the above-described URL by using the web browser 323 of the user terminal 103. FIG. 6 illustrates an example of interfaces of the website when the user accesses the URL by using the web browser 323 of the user terminal 103. When the user accesses the URL, the authentication/authorization service 313 requests the user to log in to the website. When the user inputs a login account of the website to log in, a user interface that requests the user to approve registering of the printing apparatus 101 is displayed.

In step S504, the printing apparatus 101 periodically accesses the print service 314 to check a registration approval state. In step S505, in a case where the registration is approved in the user interface illustrated in FIG. 6, the print service 314 returns the client certificate in the format of X509 issued for the printing apparatus 101, to the printing apparatus 101. In step S506, the print service 314 issues a client ID specified by OAuth 2.0 as a credential certifying that the printing apparatus 101 is a registered regular printing apparatus and returns the client ID to the printing apparatus 101. The processing to check the registration approval state executed by the printing apparatus 101 is started after step S503, and is repeatedly performed until acquisition of the client certificate is successful, until cancel of approval is notified from the print service 314, or until a predetermined period elapses. The print service 314 stores the information on the printing apparatus 101, the corresponding client certificate, and the client ID in the printer management 312.

When the cloud print application 303 transmits the client ID to the authentication/authorization service 313 in step S507, the cloud print application 303 can acquire a printer access token for access to the print service 314 in step S503. The cloud print application 303 stores the acquired client certificate, the acquired client ID, and the acquired printer access token in the HDD 204. The cloud print application 303 also stores a "registered state" as a registration state of the printing apparatus 101, and completes the registration processing.

<Creation and Publication of Printer Object by Cloud Print Service 102>

Creation and Publication of a printer object by the cloud print service 102 are described.

FIGS. 7A and 7B illustrate examples of user interfaces of a website which is provided by the print service 314 for management of the printer object. The printer object can be referred by the print service client 324 and can be designated as a printing destination. The real printer object is a printer object associated with a registered physical printing apparatus one-to-one, and the virtual printer object is a printer object associated with a plurality of printing apparatuses one-to-N.

For example, the user interfaces of a website which is provided by the print service 314 include a user interface 701 for management of a list of created printer objects. In a case where an administrator selects addition of a real printer object in the user interface 701, a real-printer-object addition screen 702 is displayed. In the real-printer-object addition screen 702, one printer to be publicized to the user terminal 103 as a printer object can be selected from among the registered printers as a printer to be associated with the printer object. Further, a user and a user group permitted for use of the selected printer are selected as a publication target destination of the real printer object. A user group "Everybody" represents that the real printer object can be used by every user.

In a case where the administrator selects addition of a virtual printer object in the user interface 701, a virtual-printer-object addition screen 703 is displayed. In the virtual-printer-object addition screen 703, a virtual printer object name to be publicized is set. A comment can also be registered as a hint for the user to select a printer object in printing. A plurality of printers can be selected from among the registered printers as printers to be associated with a printer object. A user and a user group to be permitted for use of the selected printer are selected as a publication target of the virtual printer object. In a case of the screen 703 illustrated in FIG. 7B, three printing apparatuses 101, 107, and 108 are associated with a virtual printer 003.

A type of the printer object (real printer object or virtual printer object) and the printer object name in publication are notified to a printing apparatus associated with a printer object. For example, the printing apparatus 101 may display the notified information on the local UI 301 to enable the user who wants to use the printing apparatus 101 to know which printer object the user selects when the user performs printing operation from the user terminal.

<Authentication Setting in Cloud Print Service 102>

A screen 704 in FIG. 7B is an example of a user interface which is used by an administrator to set a user authentication optional function provided by the print service 314. In a case where the administrator validates a setting 705, the authentication/authorization service 313 receives a user authentication request using the card ID from the registered printing apparatus. In a case where the administrator validates a setting 706, the authentication/authorization service 313 receives a user authentication request only with an account name (without necessity of password) from the registered printing apparatus. In a case where the setting 705 or the setting 706 is changed, change of the setting is notified from the print service 314 to the registered printing apparatus 101.

<Printing Procedure from User Terminal 103>

A printing procedure from the user terminal 103 is described with reference to FIG. 8. When the printing apparatus 101 is started up, the printing apparatus 101 is connected to the print service 314 in step S801.

In step S802, the print service client 324 receives input of the user authentication information for access to the cloud print service 102 from the user. The user account name (e.g., alice@cloud.com) and the password managed by the user management 311 are served as the user authentication information. In step S803, the print service client 324 transmits the user authentication information to the authentication/authorization service 313 and receives authorization for access to the print service 314. In step S804, the print service client 324 accesses the print service 314 and acquires a list of printer objects usable by the authorized user. The list of printer objects can be referred by the application 322 and the web browser 323 in step S805.

In step S806, the user selects a desired printer object from the list of printer objects on the UI of the user terminal 103, and instructs printing of a document and an image displayed on the application 322, the web browser 323, etc. In step S807, the document instructed for printing is transmitted to the print service client 324 from the application 322 or the web browser 323. The print service client 324 converts data of the document and the image received from the application 322 or the web browser 323 into print data in a format processable by the cloud print service 102. In step S808, the print service client 324 adds job attributes, such as the user account, the username, and the document name to the print data to generate data that is referred to as a print job, and transmits the print job to the print service 314.

The user account is a user account in the cloud print service 102 used for acquisition of the list of printer objects. The username is a name of the user using the user terminal 103. For example, a personal computer can acquire the name of the login user from the operating system 321. Table 5 illustrates an example of the information included in the print job.

TABLE 5

| Job attribute | Value |
| --- | --- |
| User account | alice@cloud.com |
| Username | Alice |
| Document name | Bill |
| Print data | . . . |

The print service 314 temporarily stores the print job received from the user terminal 103 in the printer queue. The print data transmitted from the user terminal 103 with designation of the real printer object is stored in the real printer queue 315. The print data transmitted from the user terminal 103 with designation of the virtual printer object is stored in the virtual printer queue 316. In step S809, storage of the job in the printer queue is notified to the printing apparatus 101 associated with the printer object designated in printing.

<Method of Acquiring Job List from Cloud Print Service 102>

The cloud print service 102 provides the printing apparatus 101 with a plurality of protocols for acquiring the list of print jobs from each of the real printer queue and the virtual printer queue. The plurality of protocols to be provided for acquisition of the list of print jobs and a processing procedure for each of the protocols will be described.

To confirm that the job list acquisition request has been issued from the printing apparatus associated with the real printer queue, the cloud print service 102 verifies the printer access token. In a case where the cloud print service 102 communicates with the real printer queue, verification of a user access token described below is not performed. When the print job is input to the real printer queue, the cloud print service 102 immediately notifies the printing apparatus associated with the real printer queue of input of the print job. The printing apparatus receiving the notification acquires the print job from the cloud print service 102 and immediately performs printing without receiving an instruction from the user, or acquires the print job in response to print instruction from the user via the local UI of the printing apparatus and prints the acquired print job.

The printing may be performed while the user is not present in front of the printing apparatus like the former case. Therefore, the identifier of the user is not used to access the real printer queue. In the case where the printing is not immediately performed and printing waits for the print instruction from the user like the latter case, a plurality of print jobs are held in the real printer queue. The cloud print service 102 provides a function of filtering out jobs to be returned from among the plurality of jobs held in the real printer queue by using the identifier of the user, for convenience.

In contrast, in the case of using the virtual printer queue, the processing is started when the user selects one of the plurality of printing apparatuses and performs print instruction. Therefore, the user access token is confirmed in addition to confirmation of the printer access token, to enhance security. The cloud print service 102 can perform access control to allow only the user who has input the print job to acquire the own print job by confirming the user access token. The user access token is an access ticket for the print service 314 issued when the authentication/authorization service 313 authenticates the user using the user authentication information and permits the authenticated user to access the print service 314. The user authentication information for user authentication provided by the authentication/authorization service 313 includes the user account and the password. However, in the case where the user authentication is requested from the printing apparatus, the authentication/authorization service 313 provides authentication using the card or authentication only with the user account name, in accordance with the setting. In the present exemplary embodiment, two access tokens of the user access token that represents success of user authentication to the cloud print service 102 and the printer access token that represents success of registration of the printing apparatus are used.

By combining the above-described methods, the printing apparatus 101 communicates with the cloud print service 102 with any one of protocols 1 to 5 for acquisition of the print job described below. Operation of the printing apparatus 101 and each of the protocols are described in detail.

<Protocol 1: Acquisition of List of All Print Jobs from Real Printer Queue>

Figure 9A:
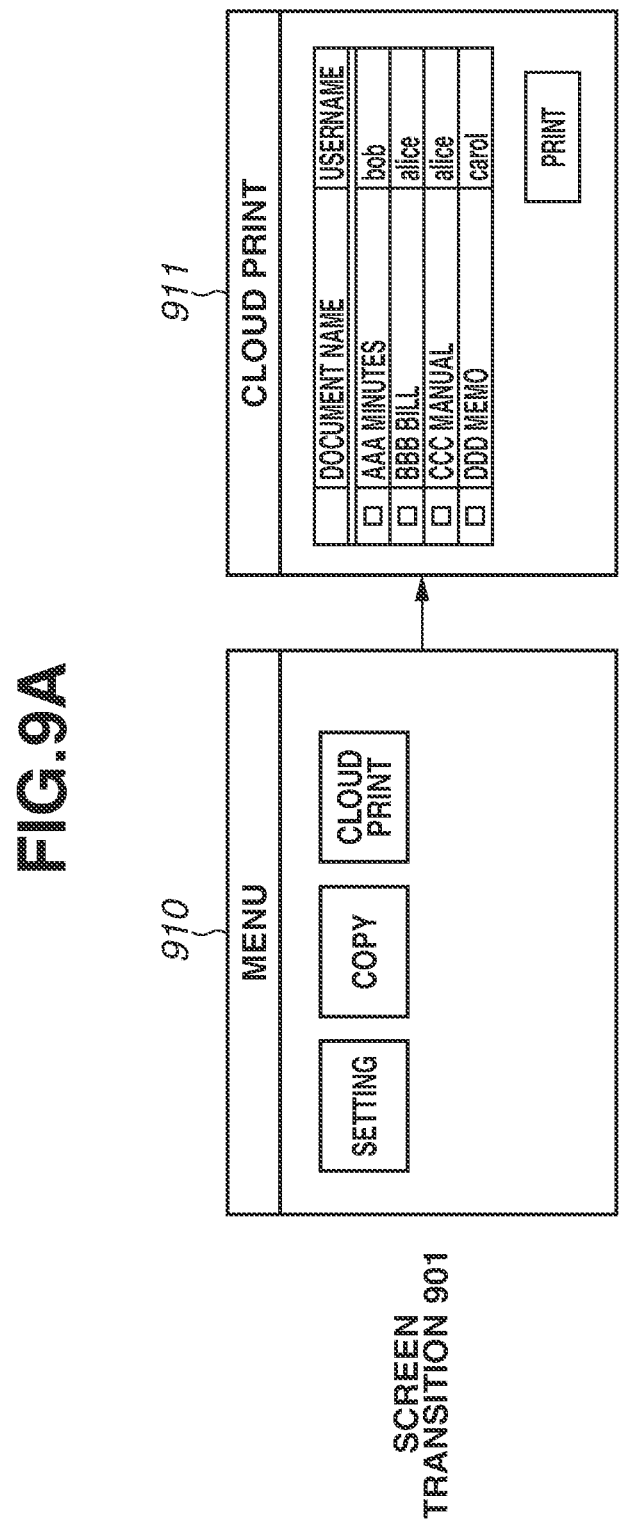

An operation procedure to acquire the list of all print jobs from the real printer queue and the communication protocol are described with reference to a screen transition diagrams of FIG. 9A and a sequence diagram of FIG. 10.

In step S1001, the user selects the cloud print application 303 from a menu screen 910 displayed on the local UI 301. In step S1002, the cloud print application 303 transmits the printer access token to the print service 314 to request the list of print jobs. The print service 314 verifies that the printer access token is an access token issued to the printing apparatus 101. In step S1003, the print service 314 acquires the list of all jobs associated with the printing apparatus 101 from the real printer queue, and returns the list to the cloud print application 303. The cloud print application 303 displays a screen 911 including the acquired list of print jobs. In step S1004, the user selects a desired print job in the screen 911, and performs print instruction. The cloud print application 303 transmits the printer access token to the print service 314 and acquires the selected print job to perform printing.

The cloud print application 303 may immediately acquire the print job and perform printing in response to reception of job input notification from the cloud print service 102, without receiving an instruction from the user. In this case, in response to reception of the job input notification, the cloud print application 303 transmits the printer access token to the print service 314 and acquires the list of print jobs and the print job to perform printing.

<Protocol 2: Acquisition of Print Job List of Specific User from Real Printer Queue>

An operation procedure to acquire the print job list of a specific user from the real printer queue and the communication protocol are described with reference to the screen transition diagram of FIG. 9B and the sequence diagram of FIG. 10.

In step S1010, the user performs login operation while a login screen 920 is displayed, to log in to the printing apparatus 101. In step S1011, the user selects the cloud print application 303 from a menu screen 921 displayed on the local UI 301.

The cloud print application 303 refers to the login context (Table 2) to acquire the user identifier of the login user. The user identifier is the login username of the printing apparatus 101 or the account of the cloud print service 102. In step S1012, the cloud print application 303 transmits the printer access token and the user identifier to the print service 314 to request the list of print jobs associated with the user identifier.

The print service 314 verifies that the printer access token is an access token issued to the printing apparatus 101. The print service 314 acquires the list of all jobs associated with the printing apparatus 101 from the real printer queue. Further, in step S1013, the print service 314 compares the received user identifier with the job attribute (account and username of cloud print service 102) to generate the list of associated print jobs, and returns the list to the cloud print application 303. The cloud print application 303 displays a screen 922 including the acquired list of print jobs. For example, in a case where the login user is "Alice", the print jobs of "Alice" are displayed on the screen 922.

<Protocol 3: Acquisition of Print Job List from Virtual Printer Queue by using User Account and Password>

An operation procedure to acquire the print job list from the virtual printer queue by using the user account and the password, and the communication protocol are described with reference to the screen transition diagram of FIG. 9C and a sequence diagram of FIG. 11A.

In step S1101, the user selects the cloud print application 303 from a menu 930 displayed on the local UI 301. The cloud print application 303 displays a screen 931 in which the account and the password for access to the cloud print service 102 are input. The screen 931 may be configured by WebView. In a case where the screen 931 is configured by WebView, the cloud print application 303 accesses the URL provided by the authentication/authorization service 313 to acquire HTML for input of the user account and the password, and displays the screen corresponding to the acquired HTML. In step S1102, the user inputs the user account and the password. In step S1103, the cloud print application 303 transmits the user account and the password to the authentication/authorization service 313. The authentication/authorization service 313 performs user authentication. In a case where the user authentication is successful, the authentication/authorization service 313 issues a user access token and a refresh token and returns the user access token and the refresh token to the cloud print application 303 in step S1104. The refresh token is a token to acquire the access token again, and an expiration date of the refresh token is normally set longer than an expiration date of the access token. Upon successfully acquiring the user access token, the cloud print application 303 closes the screen 931. In step S1105, the cloud print application 303 transmits the printer access token and the user access token to the print service 314, and requests the list of print jobs. The print service 314 verifies that the printer access token is an access token issued to the printing apparatus 101. Further, the print service 314 verifies the user access token and acquires the user account associated with the user access token. The user account nay be included in the user access token, or may be acquired from the authentication/authorization service 313 using the access token. The print service 314 accesses the virtual printer queue associated with the printing apparatus 101 and acquires the list of print jobs associated with the user account. In step S1106, the print service 314 returns the acquired list of print jobs to the cloud print application 303. The cloud print application 303 displays, on the local UI, a screen 932 that includes the acquired list of print jobs to allow the user to select a print job to be printed out.

Screen transition 904 illustrates a case where the user authentication function of the printing apparatus is valid in the protocol 3. The user performs the login operation in a login screen 940, and then selects the cloud print application 303 in a menu screen 941. The cloud print application 303 may display a user account/password input screen 942 including an option to store the user account and the password. In a case where the user selects storage of the user account and the password, the user account and the password are stored in association with the user information on the printing apparatus to which the user has been logging in. After the user account and the password are stored, the user account/password input screen 942 is not displayed. Therefore, the user can use the cloud print by the operation procedure of the screen transition 902. When the access token or the refresh token acquired in step S1104 are stored in association with the user information on the printing apparatus to which the user has been logging in, the display of the user account/password input screen 942 may be skipped while the token is valid.

<Protocol 4: Acquisition of Print Job List from Virtual Printer Queue using Card ID>

An operation procedure to acquire the print job list from the virtual printer queue using the card ID, and the communication protocol are described with reference to the screen transition diagram of FIG. 9B and the sequence diagram of FIG. 11B. This protocol is usable in the case where the setting 705 of "validate IC card authentication from registered printing apparatus" is valid.

In step S1110, the user logs in to the printing apparatus using the IC card while the login screen 920 is displayed. In step S1111, the user selects the cloud print application 303 from the menu screen 921 displayed on the local UI 301. Upon detecting selection of the cloud print application 303 from the menu on the local UI 301, the cloud print application 303 refers to the login context (Table 2) to acquire the card ID of the IC card used for login. In step S1112, the cloud print application 303 transmits the card. ID to the authentication/authorization service 313. The cloud print application 303 also transmits the digital signature and the printer access token together with the card ID to certify that the transmission is from the registered printing apparatus. The digital signature can be generated using the private key generated in printer registration. The digital signature may be added only to the card ID to be transmitted, or may be added to the entire transmission data. The authentication/authorization service 313 checks that the received printer access token and the received digital signature are owned by the registered printing apparatus. The authentication/authorization service 313 also performs the user authentication using the received card ID. In a case where the user authentication is successful, the authentication/authorization service 313 returns the user access token and the refresh token in step S1113. Upon successfully acquiring the user access token, the cloud print application 303 transmits the printer access token and the user access token to the print service 314, and requests the print job list in step S1114. The print service 314 verifies that the printer access token is an access token issued to the printing apparatus 101. The print service 314 also verifies the user access token and acquires the user account associated with the user access token. The print service 314 accesses the virtual printer queue associated with the printing apparatus 101, and further acquires the list of print jobs associated with the user account. In step S1115, the print service 314 returns the acquired list of print jobs to the cloud print application 303. On the local UI, the cloud print application 303 displays a screen 922 that includes the acquired list of print jobs and allows the user to select the print job to be printed out.

To perform printing using the virtual printer queue, the user performs user authentication to the cloud print service 102, and the authentication operation is troublesome for the user. When the protocol 4 is used, however, the user can perform authentication to the cloud print service 102 only by the IC card authentication in the printing apparatus 101. Therefore, the protocol 4 is higher in convenience than the protocols 3 and 5.

<Protocol 5: Acquisition of Print Job List from Virtual Printer Queue using User Account>

An operation procedure to acquire the print job list from the virtual printer queue using the user account, and the communication protocol are described with reference to the screen transition diagram of FIG. 9B and the sequence diagram of FIG. 11C. This protocol is usable in the case where the setting 706 of "validate authentication only with account name from registered printing apparatus" is valid. The screen 704 is illustrative as described above, and is not limited to the form of the setting 706.

In step S1120, the user performs the login operation while the login screen 920 is displayed, to log in to the printing apparatus 101. In step S1121, the user selects the cloud print application 303 from the menu screen 921 displayed on the local UI 301.

Upon detecting selection of the cloud print application 303 from the menu screen 921, the cloud print application 303 refers to the login context (Table 2) to acquire the user account of the cloud print service 102. In step S1122, the cloud print application 303 transmits the user account to the authentication/authorization service 313.

The cloud print application 303 also transmits the digital signature and the printer access token together with the user account to certify that the transmission is from the registered printing apparatus. The digital signature may be added only to the user account to be transmitted, or may be added to the entire transmission data. The authentication/authorization service 313 checks that the received printer access token and the received digital signature are owned by the registered printing apparatus. The authentication/authorization service 313 also performs the user authentication using the received user account. In a case where the user authentication is successful, the authentication/authorization service 313 returns the user access token and the refresh token in step S1123. Upon successfully acquiring the user access token, the cloud print application 303 transmits the printer access token and the user access token to the print service 314, and requests the print job list in step S1124. The print service 314 verifies that the printer access token is an access token issued to the printing apparatus 101. The print service 314 also verifies the user access token and acquires the user account associated with the user access token. The print service 314 accesses the virtual printer queue associated with the printing apparatus 101, and further acquires the list of print jobs associated with the user account. In step S1125, the print service 314 returns the acquired list of print jobs to the cloud print application 303. On the local UI, the cloud print application 303 displays the screen 922 that includes the acquired list of print jobs and allows the user to select the print job to be printed out.

<Processing Procedure to Select Protocol>

As described above, any of the above-described protocols 1 to 5 can be used in consideration of the combination of the type of the printer queue (real printer queue or virtual printer queue), the setting of the cloud print service, and valid/invalid of the user authentication function of the printing apparatus.

However, setting of any of the protocols 1 to 5 in consideration of the above-described combination may be troublesome for the user. Additionally, if the user makes a mistake in setting, the print job may not be correctly acquired.

Figure 12:
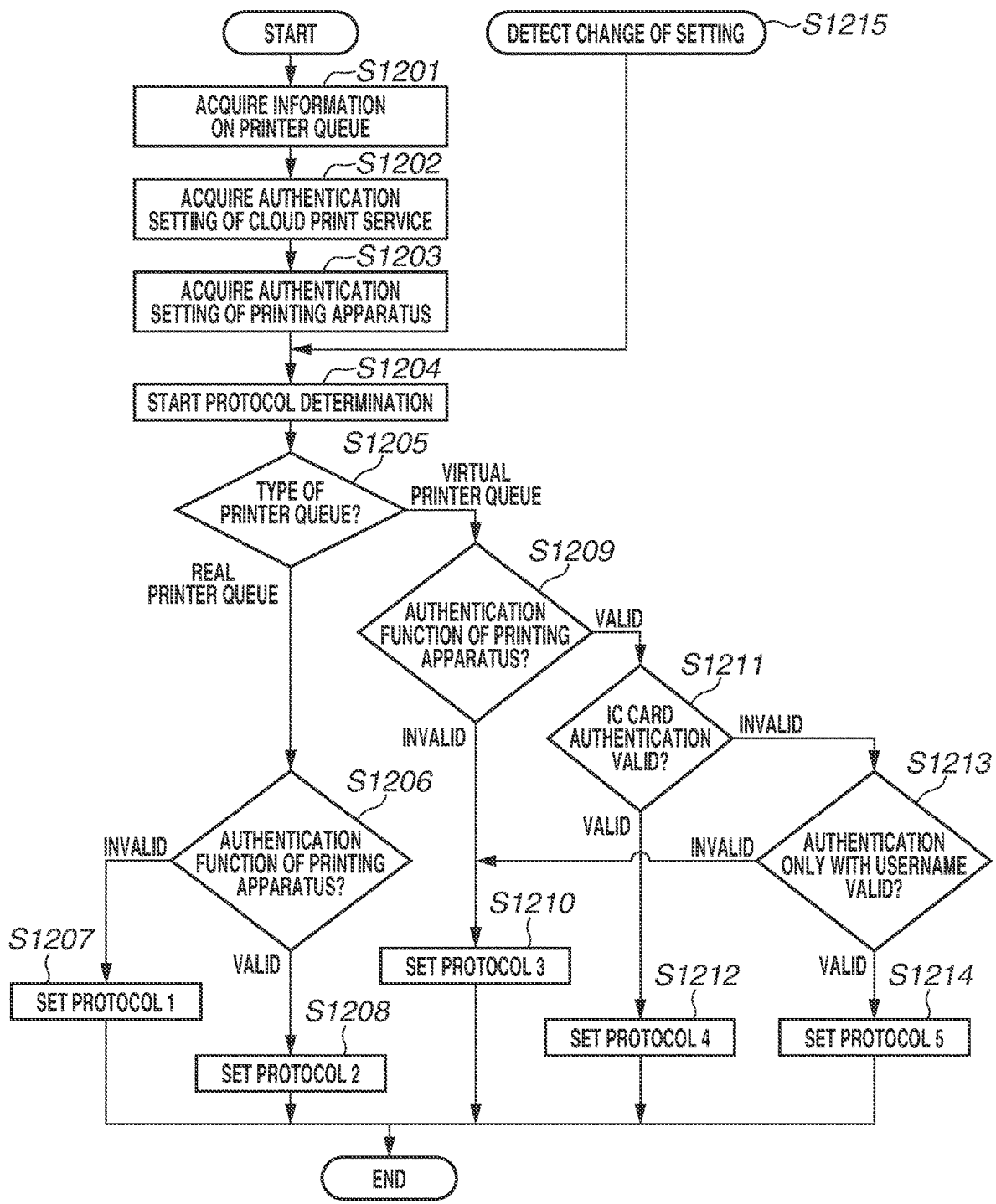
FIG. 12 is a diagram illustrating a processing procedure in protocol determination.

Therefore, the printing apparatus adopting the present exemplary embodiment acquires the necessary setting information and selects an appropriate protocol from among the protocols 1 to 5 without bothering the user. The processing procedure to select the protocol is described with reference to a flowchart of FIG. 12.

The cloud print application 303 which is executed by the CPU 201 performs the processing procedure to select the protocol.

In step S1201, to select the protocol, the cloud print application 303 transmits the printer access token to the cloud print service 102 and acquires the type of the printer queue (real printer queue or virtual printer queue) associated with the printing apparatus 101. In step S1202, the cloud print application 303 acquires the user authentication setting (705 and 706) of the cloud print service from the cloud print service 102. In step S1203, the cloud print application 303 acquires the user authentication setting of the printing apparatus itself from the user authentication unit 305.

The cloud print application 303 temporarily stores the acquired information in the RAM 203 or the HDD 204 and refers to the information in selection of the protocol. Table 6 illustrates an example of the information temporarily stored for determination of the protocol by the cloud print application 303.

TABLE 6

| Category | Setting |
| --- | --- |
| Type of printer queue | Real printer queue/Virtual printer queue |
| User authentication setting in cloud print | IC card authentication Valid/Invalid<br>Authentication only with account name Valid/Invalid |
| User authentication setting in printing apparatus | User authentication function Valid/Invalid<br>IC card login Valid/Invalid |

In step S1204, the cloud print application 303 starts determination to select any one of the protocols 1 to 5 based on the acquired information. In step S1205, the cloud print application 303 determines whether the type of the printer queue associated with the printing apparatus 101 is the real printer queue or the virtual printer queue.

In a case where the printing apparatus 101 is associated with the real printer queue (REAL PRINTER QUEUE in step S1205), the cloud print application 303 determines whether the user authentication function of the printing apparatus 101 is valid or invalid in step S1206. In a case where the user authentication function of the printing apparatus 101 is invalid (INVALID in step S1206), the user currently using the printing apparatus 101 cannot be specified. Therefore, the cloud print application 303 selects the protocol 1 in step S1207. In a case where the user authentication function of the printing apparatus 101 is valid (VALID in step S1206), the cloud print application 303 can specify the user currently using the printing apparatus 101 by referring to the login context. Therefore, the cloud print application 303 selects the protocol 2 in step S1205.

In a case where the printing apparatus 101 is associated with the virtual printer queue (VIRTUAL PRINTER QUEUE in step S1205), the cloud print application 303 then determines whether the user authentication function of the printing apparatus 101 is valid or invalid in step S1209. In a case where the user authentication function of the printing apparatus 101 is invalid (INVALID in step S1209), the user currently using the printing apparatus 101 cannot be specified. Meanwhile, to specify the user job stored in the virtual printer queue, the user interface to allow the user to input the user account and the password is displayed. Accordingly, the cloud print application 303 selects the protocol 3 in step S1210.

In a case where the user authentication function of the printing apparatus 101 is valid (VALID in step S1209), the cloud print application 303 then determines whether the IC card authentication function is valid in both of the printing apparatus 101 and the cloud print service 102 in step S1211. The setting in the user authentication setting screen 402 is checked to determine whether the IC card authentication function of the printing apparatus 101 is valid. The setting 706 is checked to determine whether the IC card authentication function of the cloud print service 102 is valid. In a case where the IC card authentication function is valid in both of the printing apparatus 101 and the cloud print service 102 (VALID in step S1211), the cloud print application 303 selects the protocol 4 in step S1212. In a case where the IC card authentication function is invalid in one or both of the printing apparatus 101 and the cloud print service 102 (INVALID in step S1211), the cloud print application 303 determines in step S1213 whether the function to perform authentication with the user account name is valid in the cloud print service 102. In a case where the function to perform authentication with the user account name is valid (VALID in step S1213), the cloud print application 303 selects the protocol 5 in step S1214. In a case where the function to perform authentication with the user account name is invalid (INVALID in step S1213), the cloud print application 303 selects the protocol 3 in step S1210.

The protocol is determined every time the cloud print application 303 is selected in the menu screen displayed on the local UI 301. Alternatively, the protocol may be determined only once when the printing apparatus 101 is started up, and the determination result may be temporarily stored in the RAM 203 or the HDD 204 and referred. Further, when setting change is notified in step S1215, the information illustrated in Table 6 is updated with new setting, and the protocol may be determined again. Further alternatively, when storage of the job in the printer queue is notified from the print service 314, the protocol may be determined again.

<Operation in Change of Printer Object>

For example, there may be a case where the administrator changes the printer object associated with the printing apparatus 101 from the real printer object to the virtual printer object using the UI of the print service 314 illustrated in FIGS. 7A and 7B. In this case, the print service 314 notifies the printing apparatus 101 of change of the type of the printer queue. In step S1215, the cloud print application 303 detects and recognizes the change of the type of the printer queue, updates the temporarily-stored information (Table 6) with new information, and determines the protocol again. Although there is a case where the printer object is changed from the virtual printer object to the real printer object, there is no difference in execution of the processing in step S1215.

<Printing Apparatus Associated with Both of Real Printer Object and Virtual Printer Object>

There is a case where the administrator associates the printing apparatus 101 with both of the real printer object and the virtual printer object using the III of the print service 314 illustrated in FIGS. 7A and 7B. In this case, any of the protocols 1 and 2 for acquisition of the job from the real printer queue and any of the protocols 3 to 5 for acquisition of the job from the virtual printer queue may be selected, and the list of jobs may be acquired from both of the real printer queue and the virtual printer queue. Further, the printing apparatus 101 can grasp that the print job has been stored in the real printer queue or the virtual printer queue by receiving, from the print service 314, notification that the job has been stored in the printer queue. Therefore, the printing apparatus 101 may access only the printer queue in which the print job has been stored.

As described above, the printing apparatus according to the present exemplary embodiment acquires the type of the cloud printer queue, the user authentication setting of the cloud, and the authentication setting of the printing apparatus, and determines the appropriate job acquisition method and the appropriate acquisition protocol. With this configuration, the print data can be acquired by the appropriate protocol without making the user to select the protocol relating to the method of acquiring the print data from the cloud print service. Occurrence of an issue that the print data cannot be acquired from the cloud print service when the user makes a mistake in the setting can be prevented.

Other Embodiments

In the first exemplary embodiment, the determination method based on the three pieces of information including the printer queue information, the authentication setting of the cloud print service 102, and the authentication setting of the printing apparatus 101 has been described. However, the determination may not be based on the three pieces of information. For example, the protocol may be determined based only on the printer queue information and the authentication setting of the printing apparatus 101. In this case, determination of the protocols 3 to 5 may be based on the setting of the protocols 3 to 5 previously set. Further, four or more pieces of information may be acquired.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-007009, filed Jan. 18, 2019, which is hereby incorporated by reference herein in its entirety.

What is claimed is:

1. A printing apparatus that includes a printing function and an authentication function, the printing function achieving cloud print by performing processing to register the printing apparatus on a print service connected via an Internet and processing to acquire a print job from a printer queue of the print service, the authentication function authenticating a user to limit use of a function, the printing apparatus comprising:
   at least a processor and at least a memory coupled to the at least the processor and having instructions stored thereon, which when executed by the at least the processor, cooperate to act as:
   an acquisition unit configured to acquire, from the print service, information relating to a printer queue type associated with the registered printing apparatus, and to acquire, from the authentication function of the printing apparatus, information relating to whether to validate or invalidate the authentication function; and
   a determination unit configured to determine one protocol from among a plurality of protocols to be used for acquisition and printing of the print job, based on at least two pieces of information acquired by the acquisition unit,
   wherein the printer queue type includes at least a real printer queue, the real printer queue being used in a case where a printer object of the print service and the printing apparatus are associated in a one-to-one relationship, and
   wherein one of the plurality of protocols to be used by the printing function is used for transmitting at least a printer access token for authentication of the printing apparatus to the print service, acquiring an information of print jobs stored in the real printer queue, and executing processing to acquire and print a print job selected from a list of print jobs.

2. The printing apparatus according to claim 1,
   wherein the acquisition unit further acquires information relating to an authentication setting for the print service to be used when the print job is acquired, and
   wherein the determination unit determines one protocol from among the plurality of protocols to be used for acquisition of the print job based on, in addition to the two pieces of information, the information relating to the authentication setting for the print service to be used when the print job is acquired.

3. The printing apparatus according to claim 1,
wherein the acquisition unit further acquires information to recognize change of the printer queue type associated with the printing apparatus, and
wherein the determination unit determines one protocol again from among the plurality of protocols to be used for acquisition of the print job in response to acquisition of the information to recognize change of the printer queue type associated with the printing apparatus.

4. The printing apparatus according to claim 1, wherein the printer queue type includes the real printer queue and a virtual printer queue, the virtual printer queue being used in a case where a printer object of the print service and the printing apparatus are associated in a one-to-many relationship.

5. The printing apparatus according to claim 4, wherein one of the protocols to be used by the printing function is used for transmitting, to the print service, a printer access token for authentication of the printing apparatus and an identifier for identification of a user authenticated by the authentication function, acquiring a list of print jobs associated with the user from among all print jobs stored in the real printer queue, and executing processing to acquire and print a print job selected from the list of print jobs associated with the user.

6. The printing apparatus according to claim 4, wherein one of the protocols to be used by the printing function is used for transmitting, to the print service, a printer access token for authentication of the printing apparatus and a user access token, acquiring a list of print jobs associated with the user from among all print jobs stored in the virtual printer queue, and executing processing to acquire and print a print job selected from the list of print jobs associated with the user, the user access token being issued when the user is authenticated through input of user authentication information for authentication by the print service.

7. The printing apparatus according to claim 4, wherein one of the protocols to be used by the printing function is used for transmitting, to the print service, a printer access token for authentication of the printing apparatus and a card identifier (ID) of an integrated circuit (IC) card used for utilization of the authentication function, acquiring a list of print jobs associated with the user from among all print jobs stored in the virtual printer queue, and executing processing to acquire and print a print job selected from the list of print jobs associated with the user.

8. The printing apparatus according to claim 4, wherein one of the protocols to be used by the printing function is used for transmitting, to the print service, a printer access token for authentication of the printing apparatus and an identifier for identification of a user authenticated by the authentication function, acquiring a list of print jobs associated with the user from among all print jobs stored in the virtual printer queue, and executing processing to acquire and print a print job selected from the list of print jobs associated with the user.

9. A method of controlling a printing apparatus, the printing apparatus including a printing function and an authentication function, the printing function achieving cloud print by performing processing to register the printing apparatus on a print service connected via an Internet and processing to acquire a print job from a printer queue of the print service, the authentication function authenticating a user to limit use of a function, the method comprising:
acquiring, from the print service, information relating to a printer queue type associated with the registered printing apparatus, and acquiring, from the authentication function of the printing apparatus, information relating to whether to validate or invalidate the authentication function; and
determining one protocol from among a plurality of protocols used for acquisition and printing of the print job, based on at least two pieces of acquired information,
wherein the printer queue type includes at least a real printer queue, the real printer queue being used in a case where a printer object of the print service and the printing apparatus are associated in a one-to-one relationship, and
wherein one of the plurality of protocols to be used by the printing function is used for transmitting at least a printer access token for authentication of the printing apparatus to the print service, acquiring an information of print jobs stored in the real printer queue, and executing processing to acquire and print a print job selected from a list of print jobs.

10. A non-transitory computer-readable storage medium storing a program configured to be executed by one or more processors of a printing apparatus that includes a printing function and an authentication function, the printing function achieving cloud print by performing processing to register the printing apparatus on a print service connected via an Internet and processing to acquire a print job from a printer queue of the print service, the authentication function authenticating a user to limit use of a function, the program including instructions, which when executed by the one or more processors, cause the printing apparatus to perform operations comprising:
acquiring, from the print service, information relating to a printer queue type associated with the registered printing apparatus, and acquiring, from the authentication function of the printing apparatus, information relating to whether to validate or invalidate the authentication function; and
determining one protocol from among a plurality of protocols to be used for acquisition and printing of the print job, based on at least two pieces of acquired information,
wherein the printer queue type includes at least a real printer queue, the real printer queue being used in a case where a printer object of the print service and the printing apparatus are associated in a one-to-one relationship, and
wherein one of the plurality of protocols to be used by the printing function is used for transmitting at least a printer access token for authentication of the printing apparatus to the print service, acquiring an information of print jobs stored in the real printer queue, and executing processing to acquire and print a print job selected from a list of print jobs.

* * * * *